(12) United States Patent
Hyo

(10) Patent No.: US 9,712,687 B2
(45) Date of Patent: Jul. 18, 2017

(54) INFORMATION PROCESSING SYSTEM AND METHOD FOR PROVIDING BUILT-IN FAULT PREDICTION LOGIC

(71) Applicant: Kiyohiro Hyo, Tokyo (JP)

(72) Inventor: Kiyohiro Hyo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/205,138

(22) Filed: Jul. 8, 2016

(65) Prior Publication Data
US 2017/0019541 A1 Jan. 19, 2017

(30) Foreign Application Priority Data

Jul. 16, 2015 (JP) ................. 2015-141906

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04L 12/58* | (2006.01) | |
| *H04L 29/08* | (2006.01) | |
| *G06K 15/00* | (2006.01) | |
| *G06F 11/07* | (2006.01) | |

(52) U.S. Cl.
CPC ....... *H04N 1/00037* (2013.01); *G06F 11/079* (2013.01); *G06F 11/0733* (2013.01); *G06K 15/408* (2013.01); *H04L 51/08* (2013.01); *H04L 51/22* (2013.01); *H04L 67/12* (2013.01); *H04N 1/0005* (2013.01); *H04N 1/00039* (2013.01); *H04N 1/00042* (2013.01); *H04N 1/00061* (2013.01); *H04N 1/00068* (2013.01); *H04N 1/00076* (2013.01); *H04N 2201/0082* (2013.01)

(58) Field of Classification Search
CPC .......... H04N 1/00037; H04N 1/00039; H04N 1/00042; H04N 1/0005; H04N 1/00061; G06F 11/0733; G06F 11/079; G06K 15/408; H04L 51/08; H04L 51/22
USPC ........................................ 358/1.15, 1.14, 1.1
See application file for complete search history.

(56) References Cited

U.S. PATENT DOCUMENTS 9,244,444 B2 * 1/2016 Carty ..................... G05B 15/02
9,462,149 B2 * 10/2016 Adachi .............. H04N 1/00082

FOREIGN PATENT DOCUMENTS

JP         2004-037941        2/2004

* cited by examiner

*Primary Examiner* — Douglas Tran
(74) *Attorney, Agent, or Firm* — IPUSA, PLLC

(57) ABSTRACT

An information processing system includes a first and second information processing systems respectively including first and second apparatuses, and a third information processing system storing history information of the first apparatus and implementing analyzing the history information to acquire a degree of influence for an item included in the history information corresponding to a fault in the first apparatus, and generating a fault prediction logic of predicting a fault in the first apparatus using the item having a relatively high degree of influence and a value of a case where the fault occurs in the first apparatus based on a result of the analysis, and building the generated fault prediction logic into the first and second apparatuses, the first and second information processing system monitoring the history information, and detecting a state of matching a content of the built-in fault prediction logic.

17 Claims, 42 Drawing Sheets

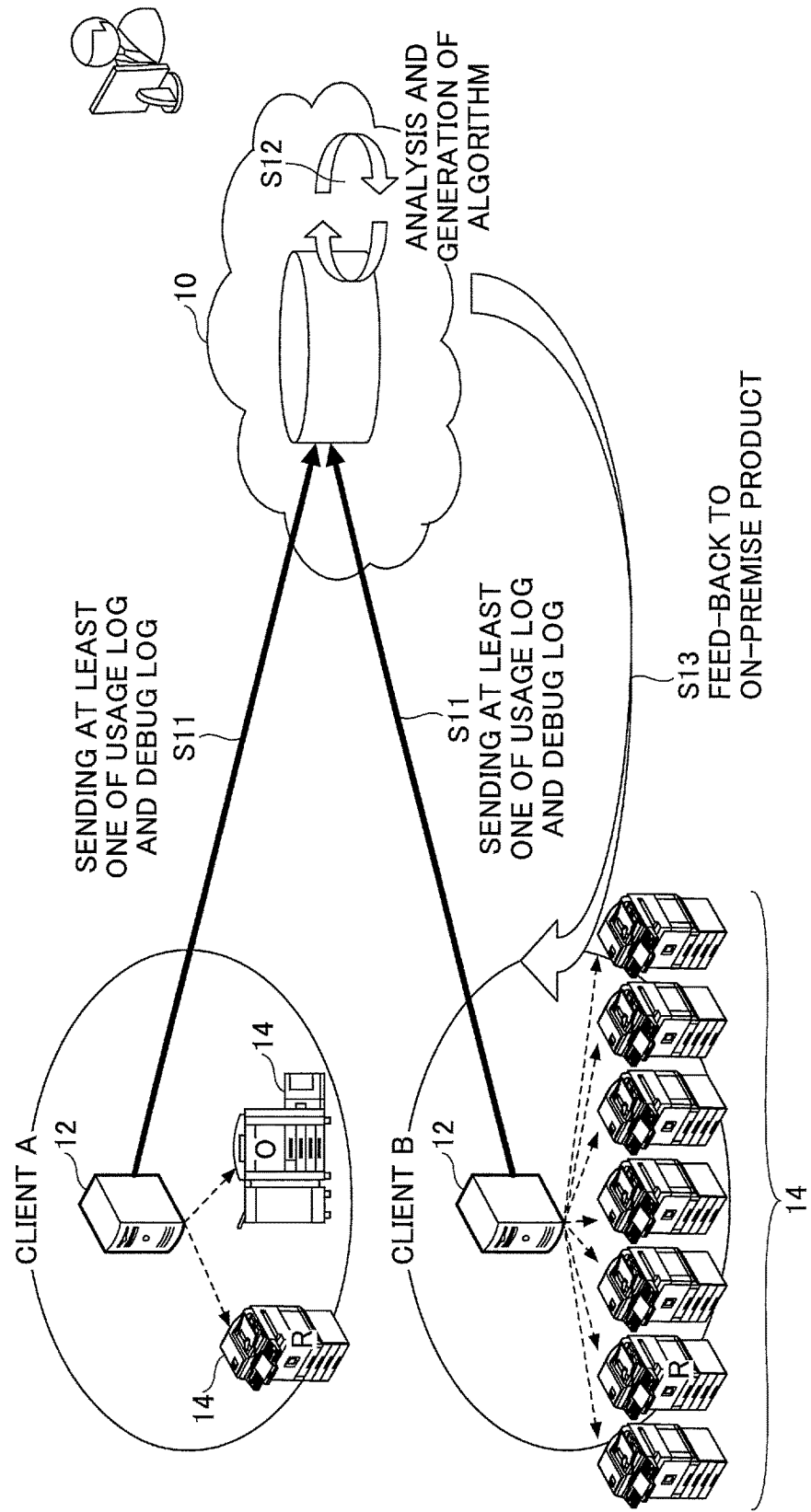

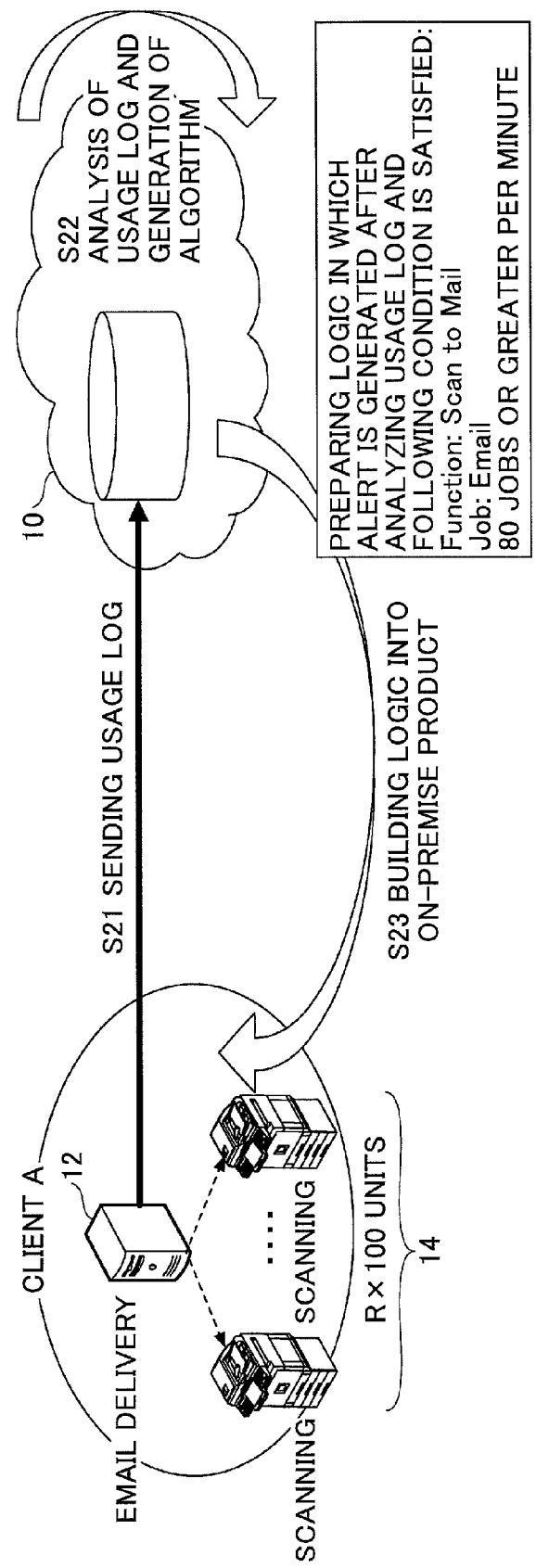

FIG.8B

CLIENT A

| start | end | Function | job | status |
|---|---|---|---|---|
| 2015-01-16T02:34:02Z | 2015-01-16T02:35:02Z | Scan to Mail | Email | error |
| 2015-01-16T02:34:12Z | 2015-01-16T02:35:12Z | Scan to Mail | Email | finish |
| 2015-01-16T02:34:22Z | 2015-01-16T02:35:22Z | Scan to Mail | Email | error |
| 2015-01-16T02:34:25Z | 2015-01-16T02:35:25Z | Scan to Mail | Email | error |
| 2015-01-16T02:34:32Z | 2015-01-16T02:35:32Z | Scan to Mail | Email | error |
| 2015-01-16T02:34:38Z | 2015-01-16T02:35:38Z | Scan to Mail | Email | finish |
| .. | .. | .. | .. | .. |

1000

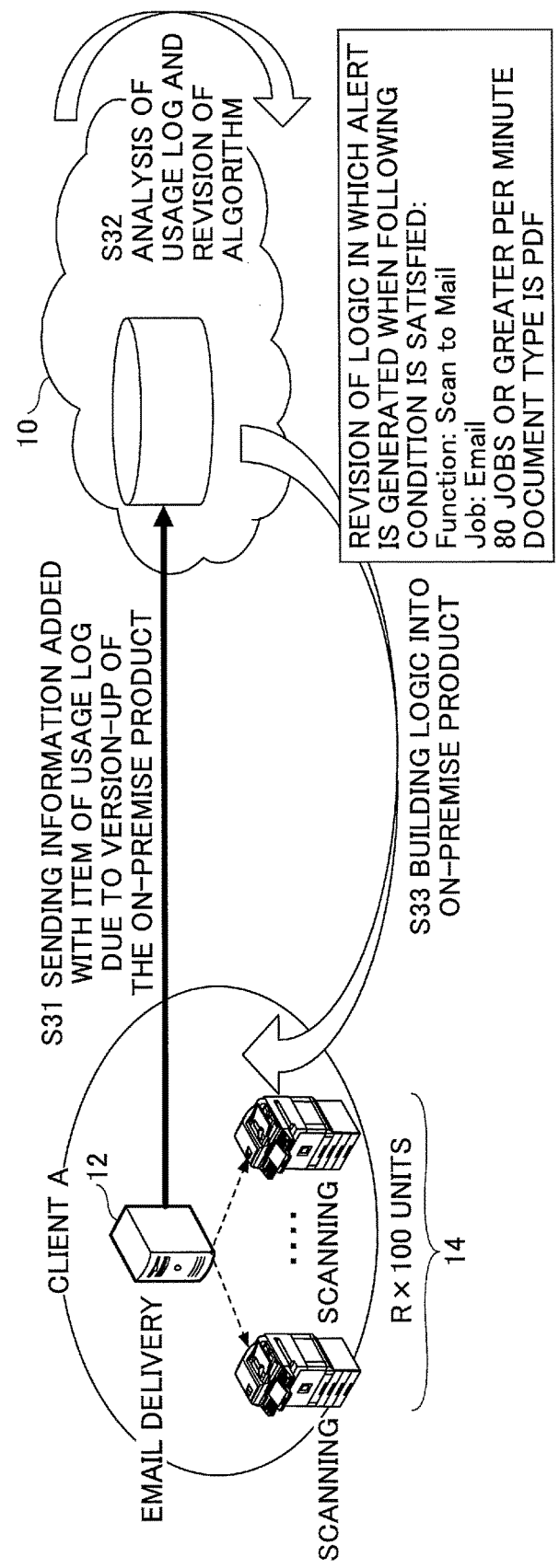

FIG.9B

CLIENT A

| start | end | Function | job | status | type |
|---|---|---|---|---|---|
| 2015-01-16T02:34:02Z | 2015-01-16T02:35:02Z | Scan to Mail | Email | error | PDF |
| 2015-01-16T02:34:12Z | 2015-01-16T02:35:12Z | Scan to Mail | Email | finish | JPEG |
| 2015-01-16T02:34:22Z | 2015-01-16T02:35:22Z | Scan to Mail | Email | error | PDF |
| 2015-01-16T02:34:25Z | 2015-01-16T02:35:25Z | Scan to Mail | Email | error | PDF |
| 2015-01-16T02:34:32Z | 2015-01-16T02:35:32Z | Scan to Mail | Email | error | PDF |
| 2015-01-16T02:34:38Z | 2015-01-16T02:35:38Z | Scan to Mail | Email | finish | JPEG |
| .. | .. | .. | .. | .. | .. |

CLIENT A

| start | end | Function | job | status | type | size |
|---|---|---|---|---|---|---|
| 2015-01-16T02:34:02Z | 2015-01-16T02:35:02Z | Scan to Mail | Email | error | PDF | 6000k |
| 2015-01-16T02:34:12Z | 2015-01-16T02:35:12Z | Scan to Mail | Email | finish | JPEG | 30k |
| 2015-01-16T02:34:22Z | 2015-01-16T02:35:22Z | Scan to Mail | Email | error | PDF | 3800k |
| 2015-01-16T02:34:25Z | 2015-01-16T02:35:25Z | Scan to Mail | Email | error | PDF | 3400k |
| 2015-01-16T02:34:32Z | 2015-01-16T02:35:32Z | Scan to Mail | Email | error | PDF | 5400k |
| 2015-01-16T02:34:38Z | 2015-01-16T02:35:38Z | Scan to Mail | Email | finish | JPEG | 80k |
| .. | .. | .. | .. | .. | .. | .. |

CLIENT A

| start | end | Function | job | status | type | size |
|---|---|---|---|---|---|---|
| 2015-01-16T02:34:02Z | 2015-01-16T02:35:02Z | Scan to Mail | Email | error | PDF | 6000k |
| 2015-01-16T02:34:12Z | 2015-01-16T02:35:12Z | Scan to Mail | Email | finish | JPEG | 30k |
| 2015-01-16T02:34:22Z | 2015-01-16T02:35:22Z | Scan to Mail | Email | error | PDF | 3800k |
| 2015-01-16T02:34:25Z | 2015-01-16T02:35:25Z | Scan to Mail | Email | error | PDF | 3400k |
| 2015-01-16T02:34:32Z | 2015-01-16T02:35:32Z | Scan to Mail | Email | error | PDF | 5400k |
| 2015-01-16T02:34:38Z | 2015-01-16T02:35:38Z | Scan to Mail | Email | finish | JPEG | 80k |
| .. | .. | .. | .. | .. | .. | .. |

| ID | TIME AND DATE OF UPDATE | VERSION OF LOGIC | ENTITY OF LOGIC | APPLIED CLIENT |
|---|---|---|---|---|
| 1 | 2015-01-01 01:23:45 | 1.0.0 | http://sample.com/1 | CLIENT ID1, CLIENT ID3 |
| 2 | 2015-02-02 02:34:45 | 1.0.0 | http://sample.com/2 | CLIENT ID2, CLIENT ID4 |
| 3 | 2015-03-03 03:45:50 | 1.0.0 | http://sample.com/3 | CLIENT ID5 |

FIG.21B

EXAMPLE OF ORIGINAL DATA

CLIENT A

| start | end | Function | job | status |
|---|---|---|---|---|
| 2015-01-16T02:34:02Z | 2015-01-16T02:35:02Z | Scan to Mail | Email | error |
| 2015-01-16T02:34:12Z | 2015-01-16T02:35:12Z | Scan to Mail | Email | finish |
| 2015-01-16T02:34:22Z | 2015-01-16T02:35:22Z | Scan to Mail | Email | error |
| 2015-01-16T02:34:25Z | 2015-01-16T02:35:25Z | Scan to Mail | Email | error |
| 2015-01-16T02:34:32Z | 2015-01-16T02:35:32Z | Scan to Mail | Email | error |
| 2015-01-16T02:34:38Z | 2015-01-16T02:35:38Z | Scan to Mail | Email | finish |
| .. | .. | .. | .. | .. |

| CLIENT A | |
|---|---|
| start | minute |
| 2015-01-16T02:34:02Z | 2015-01-16T02:34 |
| 2015-01-16T02:34:12Z | 2015-01-16T02:34 |
| : | : |
| 2015-01-16T02:35:25Z | 2015-01-16T02:35 |
| 2015-01-16T02:35:32Z | 2015-01-16T02:35 |
| 2015-01-16T02:35:38Z | 2015-01-16T02:35 |
| : | : |

FIG.21E

ACCUMULATING LOGIC IN WHICH LOG IS ANALYZED
AND WHEN FOLLOWING CONDITIONS ARE SATISFIED
ALERT IS OUTPUT:
Function: Scan to Mail
Job: Email
80 JOBS OR GREATER PER MINUTE

FIG.27

| PATTERN NO. | FUNCTION | LOG | LOGIC | SUMMARY OF PROCESS |
|---|---|---|---|---|
| 1 | ← | ← | ← | PROCESS A: THERE MAY BE CASE WHERE LOGIC IS NOT USEFUL IN VERSION IN CASE WHERE UPDATED LOGIC IS APPLIED TO OLD FUNCTION OR OLD LOG. |
| 2 | ← | ↑ | ← | |
| 3 | ↑ | ← | ← | (1) APPLYING CONSIDERING VERSION IN LOGIC<br>(2) MAINTAINING EACH VERSION IN LOGIC MEMORY UNIT AND DETERMINING AT TIME OF APPLYING LOGIC. |
| 4 | ↑ | ↑ | ← | ONLY LOGIC IS CONTINUOUSLY UPDATED. |
| 5 | ↑ | ← | ↑ | PROCESS B: CHECKING THAT SCHEMA CHANGE OF LOG DOES NOT INFLUENCE LOGIC ON SIDE OF CLOUD. |
| 6 | ← | ← | ↑ | |
| 7 | ← | ↑ | ↑ | PROCESS C: CHECKING THAT FUNCTION UP DOES NOT INFLUENCE LOGIC ON SIDE OF CLOUD. |
| 8 | ↑ | ↑ | ↑ | CONSIDERATION UNNECESSARY |

↑ : VERSION UP   → : VERSION UNCHANGED

FIG.28B

| start | end | Function | job | status | type | size | Function Version | Kbps | Log Version |
|---|---|---|---|---|---|---|---|---|---|
| 2015-01-16T02:34:02Z | 2015-01-16T02:35:02Z | Scan to Mail | Email | error | PDF | 6000k | 2.1.1 | 50.3 | 1.0.0 |
| 2015-01-16T02:34:12Z | 2015-01-16T02:35:12Z | Scan to Mail | Email | finish | JPEG | 30k | 2.1.1 | 62.1 | 1.0.0 |
| 2015-01-16T02:34:22Z | 2015-01-16T02:35:22Z | Scan to Mail | Email | error | PDF | 3800k | 2.1.1 | 50.2 | 1.0.0 |
| 2015-01-16T02:34:25Z | 2015-01-16T02:35:25Z | Scan to Mail | Email | error | PDF | 3400k | 2.1.1 | 50.1 | 1.0.0 |
| 2015-01-16T02:34:32Z | 2015-01-16T02:35:32Z | Scan to Mail | Email | error | PDF | 5400k | 2.1.1 | 50.2 | 1.0.0 |
| 2015-01-16T02:34:38Z | 2015-01-16T02:35:38Z | Scan to Mail | Email | finish | JPEG | 80k | 2.1.1 | 60.1 | 1.0.0 |
| .. | .. | .. | .. | .. | .. | .. | .. | .. | .. |

FOR EXAMPLE, FOLLOWING CONTENT
Function: Scan to Mail
Job: Email
80 JOBS OR GREATER PER MINUTE
DOCUMENT FILE TYPE IS PDF
DOCUMENT FILE SIZE IS 3000 Kbyte OR GREATER BECOMES AS FOLLOWS BY CONSIDERING LOGIC AS EXAMPLE
Function: Scan to Mail
Job: Email
80 JOBS OR GREATER PER MINUTE
DOCUMENT FILE TYPE IS PDF
DOCUMENT FILE SIZE IS 3000 Kbyte OR GREATER
AND FUNCTION VERSION IS UP TO 2.1.1
AND LOG VERSION IS UP TO 1.0.0

FIG.29

| ID | TIME AND DATE OF UPDATE | VERSION OF LOGIC | VERSION OF FUNCTION | VERSION OF LOG | ENTITY OF LOGIC | APPLIED CLIENT |
|---|---|---|---|---|---|---|
| 1 | 2015-01-01 01:23:45 | 1.0.0 | 2.1.1 | 1.0.0 | http://sample.com/1 | CLIENT ID1, CLIENT ID3 |
| 2 | 2015-02-02 02:34:45 | 1.0.0 | 2.1.1 | 1.0.0 | http://sample.com/2 | CLIENT ID2, CLIENT ID4 |
| 3 | 2015-03-03 03:45:50 | 1.0.0 | 2.1.1 | 1.0.0 | http://sample.com/3 | CLIENT ID5 |

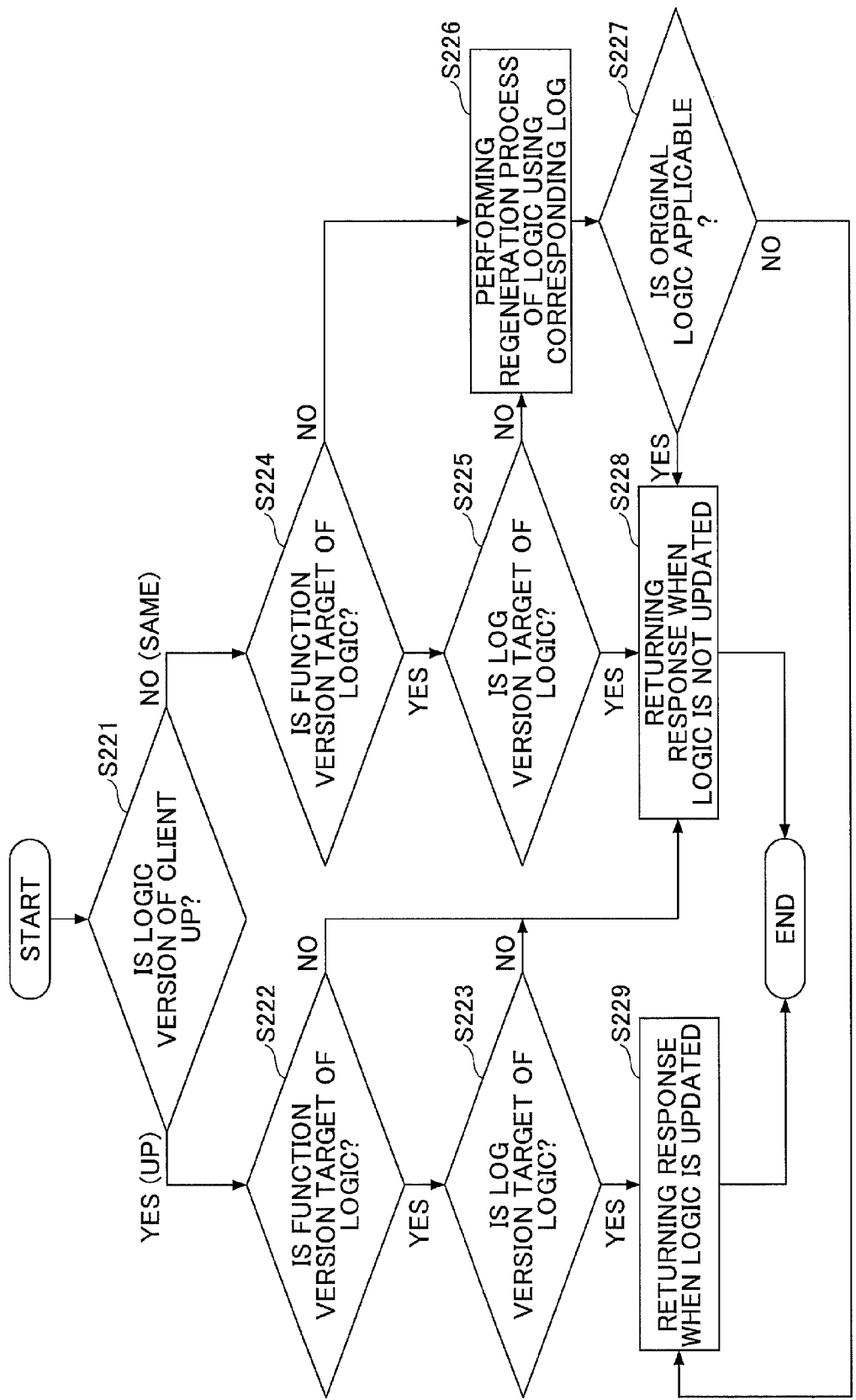

INFORMATION PROCESSING SYSTEM AND METHOD FOR PROVIDING BUILT-IN FAULT PREDICTION LOGIC

CROSS-REFERENCE TO RELATED APPLICATIONS

The present application claims priority under 35 U.S.C. §119 to Japanese Patent Application No. 2015-141906, filed Jul. 16, 2015. The contents of which are incorporated herein by reference in their entirety.

BACKGROUND OF THE INVENTION

Field of the Invention

The present disclosure relates to information processing systems and methods for providing a built-in fault prediction logics.

Description of the Related Art

During recent years, an information processing system including apparatuses such as a copier and a printer is being used so that an information processing apparatus acquires a usage log, a debug log, and other data from the apparatuses and predicts the apparatuses in which a fault such as an error or a failure is about to occur.

An exemplary administering system for an image forming apparatus analyses, when each image forming apparatus sends state information indicative of a state of each image forming apparatus to an administering apparatus and the administering apparatus receives the state information, the content of the state information and selectively send information related to maintenance or repair (for example, Japanese Unexamined Patent Application Publication No. 2004-37941).

SUMMARY OF THE INVENTION

One aspect of the present invention is an information processing system including a first information processing system including at least one first apparatus; a second information processing system including at least one second apparatus; and a third information processing system storing history information of the at least one first apparatus included in the first information processing system, the third information processing system including a hardware processor implementing: analyzing the history information to acquire a degree of influence for an item included in the history information corresponding to a fault occurring in the at least one first apparatus; and generating a fault prediction logic of predicting a fault occurring in the at least one first apparatus using the item having a relatively high degree of influence and a value of a case where the fault occurs in the at least one first apparatus based on a result of the analysis; and building the generated fault prediction logic into the at least one first apparatus included in the first information processing system and the at least one second apparatus included in the second information processing system, the first information processing system including a first hardware processor implementing: monitoring the history information of the at least one first apparatus; detecting a state of matching a content of the built-in fault prediction logic; and performing a predetermined action in a case where the state of matching the content of the built-in fault prediction logic is detected, and the second information processing system including a second hardware processor implementing: monitoring the history information of the at least one second apparatus; detecting a state of matching a content of the built-in fault prediction logic; and performing a predetermined action in a case where the state of matching the content of the built-in fault prediction logic is detected.

BRIEF DESCRIPTION OF THE DRAWINGS

FIG. 7 is a diagram illustrating a summary of an exemplary process of the information processing system of the embodiment of the present invention;

FIGS. 8A and 8B are diagrams illustrating an exemplary process of the information processing system of the embodiment of the present invention;

FIGS. 9A and 9B are diagrams illustrating an exemplary process of the information processing system of the embodiment of the present invention;

FIG. 10A and 10B are diagrams illustrating an exemplary process of the information processing system of the embodiment of the present invention;

FIG. 12A and 12B are diagrams illustrating another exemplary log registration process of registering the log in the cloud service system;

FIG. 16 illustrates a structure of exemplary accumulated data accumulated in a logic memory unit;

FIGS. 21A to 21E are diagrams illustrating an exemplary analysis of the usage log and an exemplary process of logic generation;

FIG. 27 illustrates a check of a combination of the function of the client environment, the log (a schema), and the logic at a time of version-up of the function of the client environment, the log (the schema), and the logic;

FIGS. 28A-28C are diagrams illustrating an exemplary process in a case where the version of the function or the version of the log is considered in the logic;

FIG. 29 illustrates a structure of other exemplary accumulated data accumulated in the logic generating unit;

FIG. 31 is a flowchart of an exemplary process of checking that a schema change of the log in a process B and a process C does not influence the logic or that a version-up of the function does not influence the logic.

DESCRIPTION OF THE EMBODIMENTS

In an example of an information processing system including an apparatus such as a copier and a printer, the apparatuses in which a fault such as an error or a failure is about to occur are predicted by an information processing apparatus located on a service providing side such as a cloud service located outside a client (on-premise) environment. In this example of the information processing system including the apparatus such as the copier and the printer, it may be preferable that the apparatuses in which a fault such as an error or a failure is about to occur are predicted on a client environment side.

The embodiment of the present invention is provided in consideration of this point. The object of the embodiment of the present invention is to provide an information processing system, in which a fault prediction logic based on history information acquired from an apparatus on the client environment side can be built in the client environment side.

An embodiment of the present invention is described in detail below.

First Embodiment

<System Structure>

Figure 1:
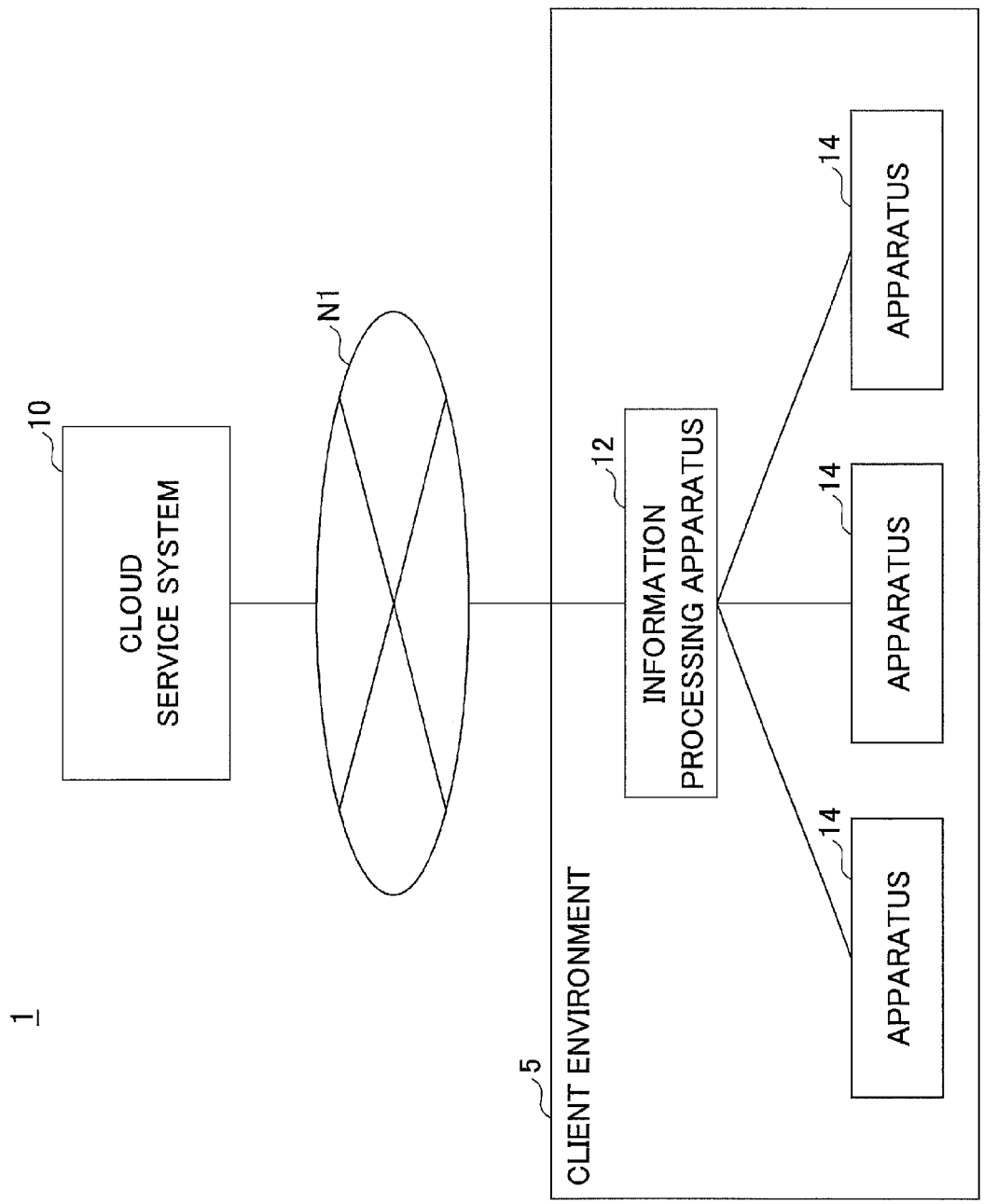
FIG. 1 is a diagram illustrating an exemplary structure of an information processing system of an embodiment of the present invention.

FIG. 1 is a diagram illustrating an exemplary structure of an information processing system of an embodiment of the present invention. An information processing system 1 includes a cloud service system 10, an information processing apparatus 12 of a client environment 5, and a network N1 such as the Internet through which the cloud service system 10 and the information processing apparatus 12 are connected. Further, in the client environment 5, the information processing apparatus 12 is connected to at least one apparatus 14.

The cloud service system 10 is an example of a system on a service providing side which provides a service to a client. Therefore, the cloud service system 10 may be a system of serving a service onto the client environment side such as an application service provider (ASP) service system. The cloud service system 10 includes at least one information processing apparatus.

The information processing apparatus 12 on the client environment side can communicate with the cloud service system 10 through the network N1. A usage log, a debug log, and another data are registered from the at least one apparatus 14 into the information processing apparatus and sent to the cloud service system 10. The number of the information processing apparatus 12 on the client environment side may be multiple.

The apparatus 14 may be an electronic apparatus used by the client and used to register the usage log, the debug log, and the other data in the information processing apparatus 12. For example, the apparatus 14 is an image forming apparatus such as a printer, a copier, a multifunction peripheral, and a laser printer.

The cloud service system 10 analyzes the usage log, the debug log, and the other data, which are received from the information processing apparatus 12, and generates a logic (a fault prediction logic) which is implemented by a program or a data format (see FIG. 16), and conducts a prediction of a fault such as an error and a failure as described below.

The cloud service system 10 causes the generated logic to be built into the information processing apparatus 12 and the apparatus 14, which are on the client environment side, as described below. The information processing apparatus 12 and the apparatus 14, which are on the client environment side and includes the built-in logic, monitors the usage log, the debug log, and the other data. If a state of the apparatus 14 satisfies a condition included in the logic, the logic reports using a user interface (UI) or a mail delivery, a function limitation, or the like.

The structure of the information processing system 1 illustrated in FIG. 1 is an example and may be another structure. For example, the information processing system 1 is not limited to the words such as the cloud service and the client environment.

<Hardware Structure>

Figure 2:
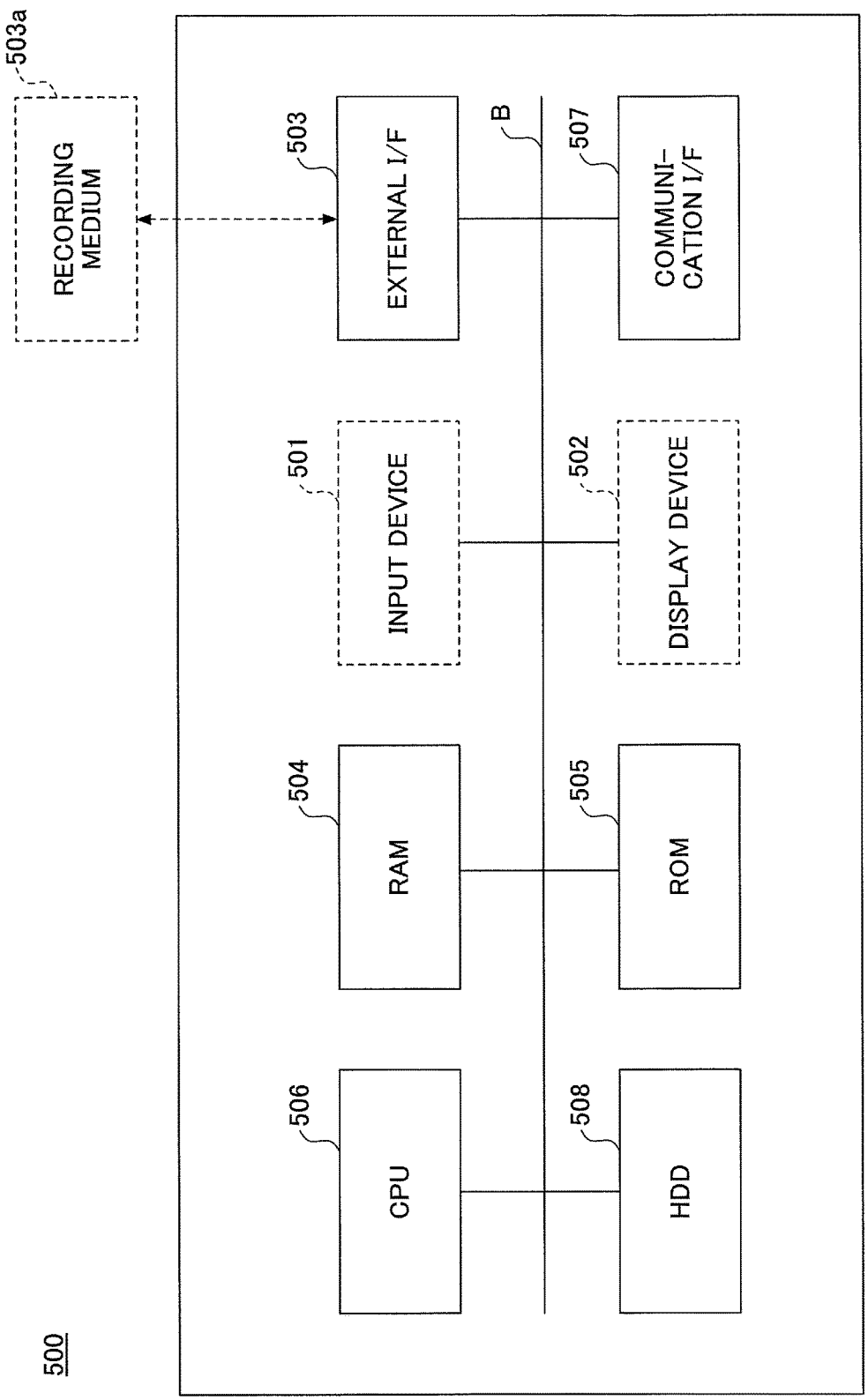
FIG. 2 is a diagram illustrating an exemplary hardware structure of a computer of the embodiment of the present invention.

The information processing apparatus included in the cloud service system 10 and the information processing apparatus 12 in the client environment 5 are implemented by a computer or the like having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external interface (I/F) 503, a random access memory (RAM) 504, a read-only memory (ROM) 505, a central processing unit (CPU) 506, a communication interface (I/F) 507, a hard disk drive (HDD) 508, and so on, which are mutually connected by a bus B. It is acceptable to use a mode where the input device 501 and the display device 502 are connected when necessary.

The input device 501 includes a keyboard, a mouse, or the like, by which the user inputs various operation signals. The display device 502 includes a display or the like to display a processing result obtained from the computer 500.

The communication I/F 507 is an interface disposed to connect the computer 500 with the network N1. Thus, the computer 500 can perform data communications through the communication I/F 507.

The HDD 508 is a non-volatile memory device storing a program and data. The program and the data, which are to be stored, are an operating system (OS) which is basic software to control the entire computer 500, application software providing various functions in the OS, and so on.

The external I/F 503 is an interface with an external apparatus. The external apparatus includes a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and a data even when a power source is powered off. The ROM 505 stores a program and a data for a basic input/output system (BIOS), an OS setup, a network setup, and so on, which are executed at a time of starting up the computer 500. The RAM 504 is a volatile semiconductor memory temporarily storing a program or a data.

The CPU 506 can read the program and the data from the memory device such as the ROM 505 and the HDD 508. The read program or the read data undergo a process to implement a control or a function of the entire computer 500.

The information processing apparatus included in the cloud service system 10 and the information processing apparatus 12 in the client environment 5 can perform various processes described below using the hardware structure of the above-described computer 500.

Figure 3:
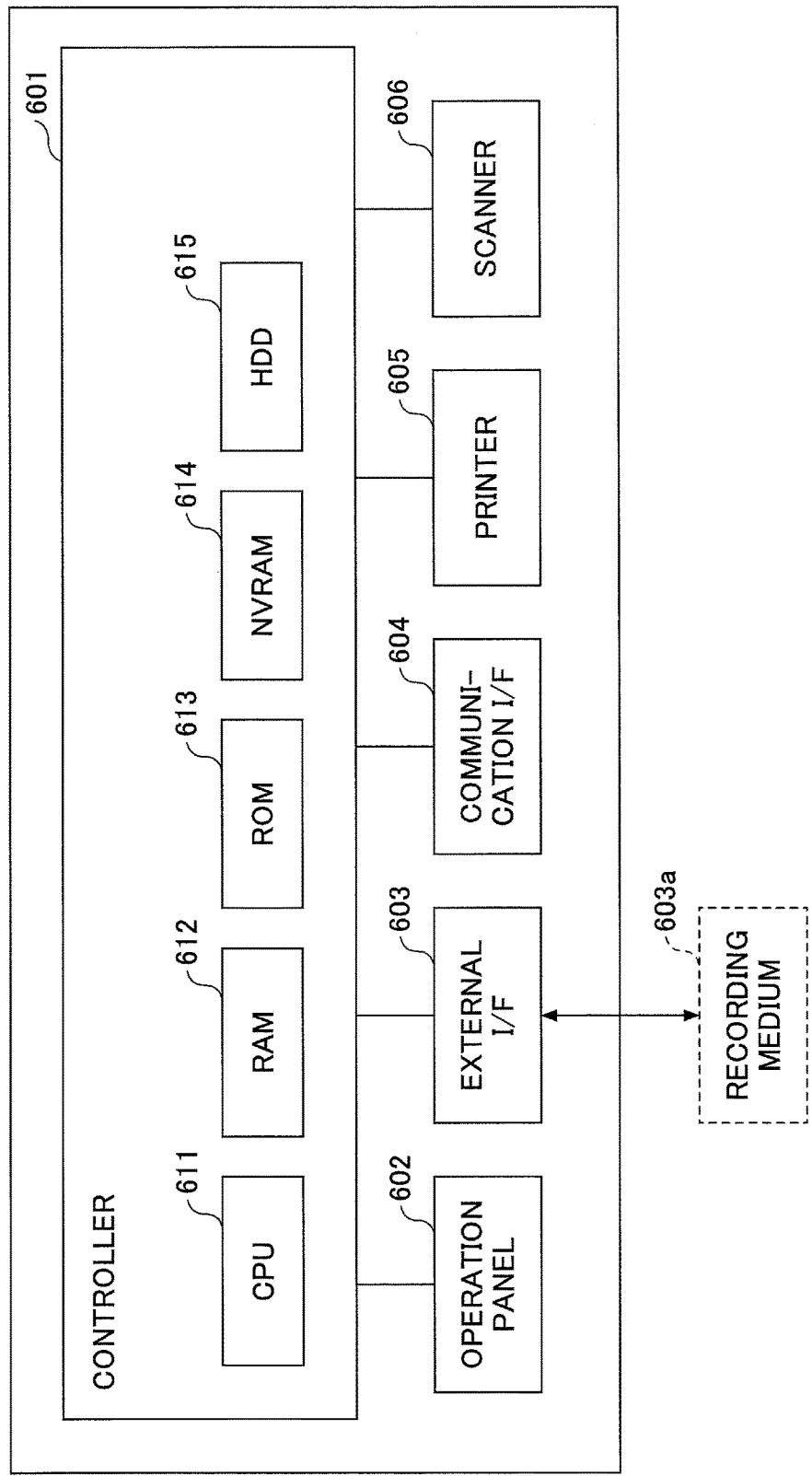
FIG. 3 is a diagram illustrating an exemplary hardware structure of an apparatus of the embodiment of the present invention.

When the apparatus 14 illustrated in FIG. 1 is, for example, a multifunction peripheral, the various processes can be performed using the hardware structure as illustrated in FIG. 3. FIG. 3 is a diagram illustrating an exemplary hardware structure of the apparatus of the first embodiment of the present invention. The apparatus 14 illustrated in FIG. 3 includes a controller 601, an operation panel 602, an external interface (I/F) 603, a communication interface (I/F) 604, a printer 605, a scanner 606, and so on.

The controller 601 includes a central processing unit (CPU) 611, a random access memory (RAM) 612, a read-only memory (ROM) 613, a non-volatile random access memory (NVRAM) 614, a hard disk drive (HDD) 615, and so on. Various programs and data are stored in the ROM 613. The RAM 612 temporarily stores the program and the data. For example, setup information and so on are stored in the NVRAM 614. Various programs and data are stored in the HDD 615.

The CPU 611 reads the program, the data, the setup information, or the like into the RAM 612 from the ROM 613, the NVRAM 614, the HDD 615, or the like and performs the process to implement a control or a function of the entire apparatus 14.

The operation panel 602 includes an input unit for receiving an input from the user and a display unit for performing display. The external I/F 603 is an interface with the external apparatus. The external apparatus includes a recording medium 603a and so on. With this, the apparatus 14 can perform at least one of reading information from the recording medium 603a through the external I/F 603 and writing the information to the recording medium 603a through the external I/F 603. The recording medium 603a is an integrated circuit (IC) card, a flexible disk, a compact disk (CD), a digital versatile disk (DVD), a secure digital (SD) memory card, a universal serial bus (USB) memory, or the like.

The communication I/F 604 is an interface for connecting the apparatus 14 to the information processing apparatus 12 directly or through a network. With this, the apparatus 14 can perform data communications with the information processing apparatus 12 through the communication I/F 604. The printer 605 is provided for printing print data on a print paper. The scanner 606 is a reading device for reading image data (electronic data) from an original manuscript.

<Software Structure>
<<Cloud Service System>>

Figure 4:
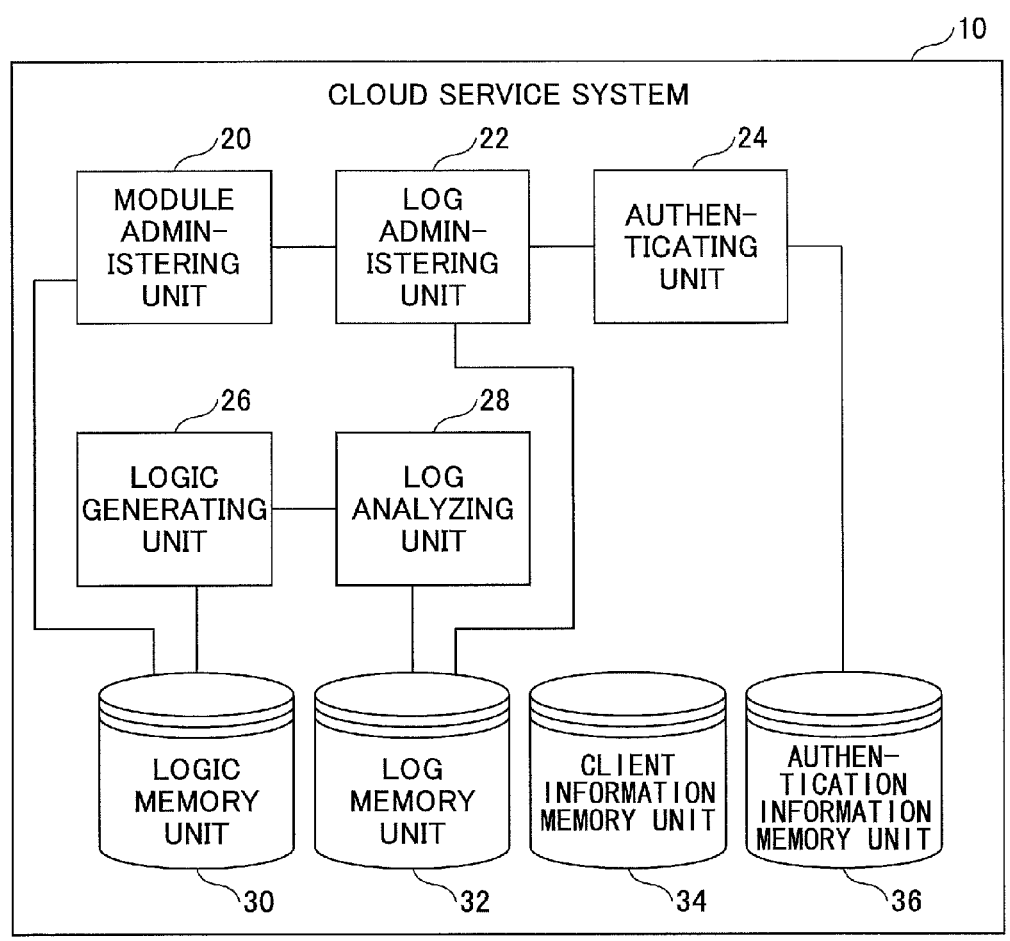
FIG. 4 is a processing block diagram of an exemplary cloud service system of the embodiment of the present invention.

A cloud service system of the first embodiment is implemented by a processing block illustrated in, for example, FIG. 4. FIG. 4 is a processing block diagram of an exemplary information processing system of the first embodiment.

The cloud service system 10 implements a module administering unit 20, a log administering unit 22, an authenticating unit 24, a logic generating unit 26, a log analyzing unit 28, a logic memory unit 30, a log memory unit 32, a client information memory unit 34, and an authentication information memory unit 36 by executing a program.

The module administering unit 20 illustrated in FIG. 4 administers the logic stored in the logic memory unit 30. The log administering unit 22 administering a log accumulated in the log memory unit 32. The authenticating unit 24 uses authentication information stored in the authentication information memory unit 36 and performs application (app) authentication of the information processing apparatus 12 (a client) in the client environment 5.

The logic generating unit 26 generates the logic from an analysis result obtained by analyzing the log. The analysis result is stored in the logic memory unit 30. The log analyzing unit 28 analyzes the log stored in the log memory unit 32. The logic memory unit 30 stores the logic. The log memory unit 32 accumulates the log. The client information memory unit 34 stores client information. The authentication information memory unit 36 stores the authentication information to be used for the app authentication.

<<Information Processing Apparatus in Client Environment>>

Figure 5A:
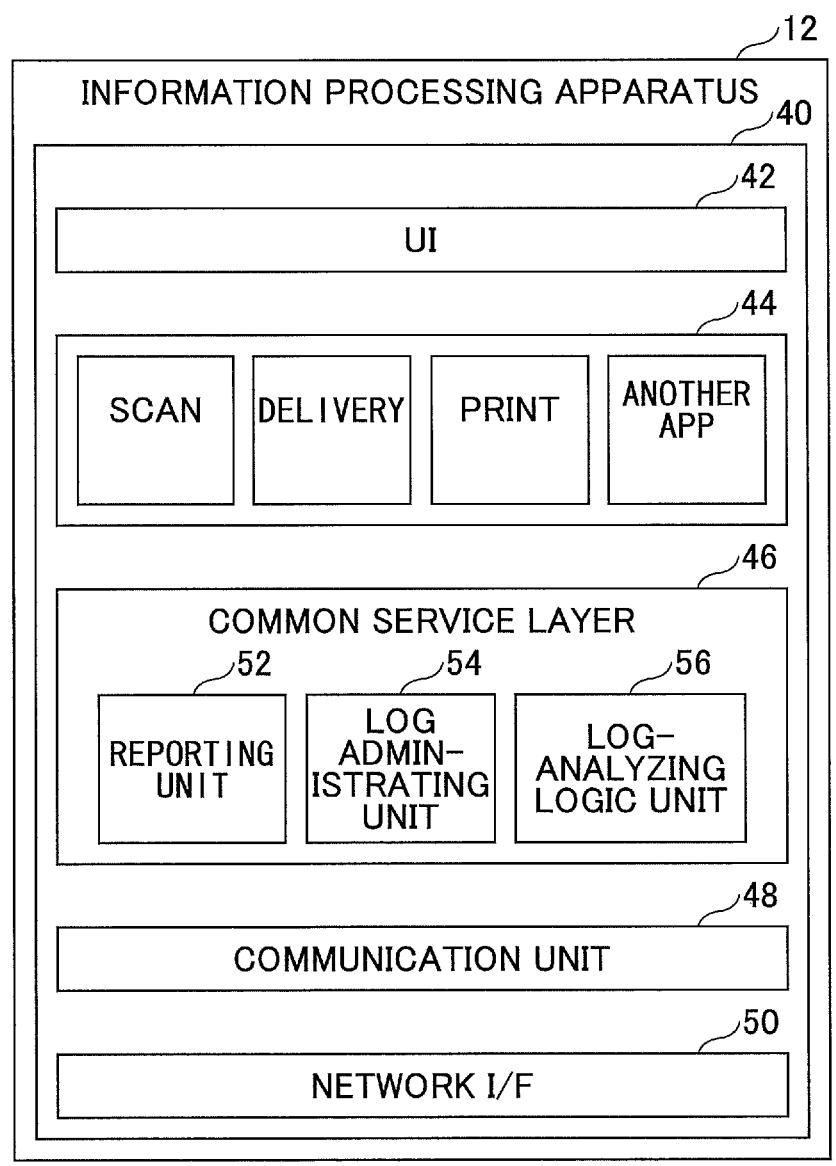
FIGS. 5A and 5B are processing block diagrams of an exemplary information processing apparatus in a client environment of the embodiment of the present invention.
Figure 5B:
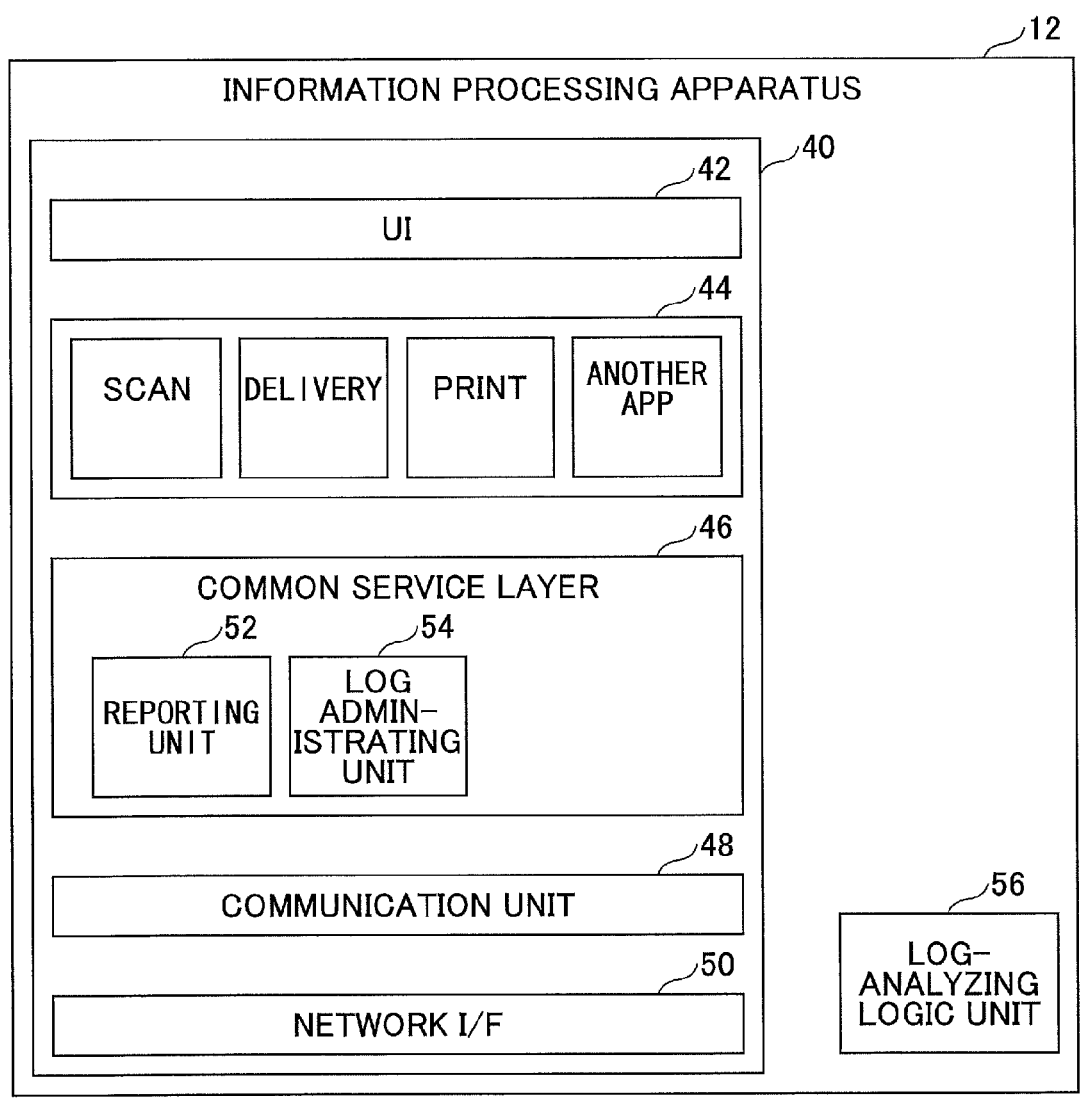

The information processing apparatus 12 in the client environment 5 according to the first embodiment is implemented by a processing block illustrated, for example, FIGS. 5A and 5B. FIGS. 5A and 5B are processing block diagrams of an exemplary information processing apparatus in the client environment 5 of the first embodiment of the present invention.

FIG. 5A illustrates an example where a log-analyzing logic unit is built, as a module, into the application 40, which is installed in the information processing apparatus 12. FIG. 5B illustrates an example where the log-analyzing logic unit is externally attached, as a module, to the application 40, which is installed in the information processing apparatus 12.

The application 40, which is a product (an on-premise product) existing in the client environment 5, is installed in the information processing apparatus 12 in the client environment. The information processing apparatus 12 executes the application 40 to implement a user interface (UI) 42, an application (app) layer 44, a common service layer 46, a communication unit 48, and a network interface (I/F) 50. The common service layer 46 includes the reporting unit 52 and the log administering unit 54, which are used in common by the app layer 44 and so on.

FIG. 5A illustrates an example where the log-analyzing logic unit 56 is built in the common service layer 46 of the on-premise product. FIG. 5B illustrates an example where the log-analyzing logic unit 56 is externally attached to the on-premise product to be installed in the information processing apparatus 12.

The log administering unit 54 administers the usage log, the debug log, and another data of the apparatus 14. The log-analyzing logic unit 56 monitors the usage log, the debug log, and another data of the apparatus 14 and reports to the reporting unit 52 in a state where the usage log, the debug log, and the other data of the apparatus 14 matches a content (a condition) of the logic built into the reporting unit 52. Upon receipt of the report from the log-analyzing logic unit 56, the reporting unit 52 conducts a report using a user interface (UI) 142, a report using mail delivery by a delivery unit of the app layer 44, a function limitation to the app layer 44 (e.g., a limitation to a scan function), or the like.

<<Apparatus in Client Environment>>

Figure 6:
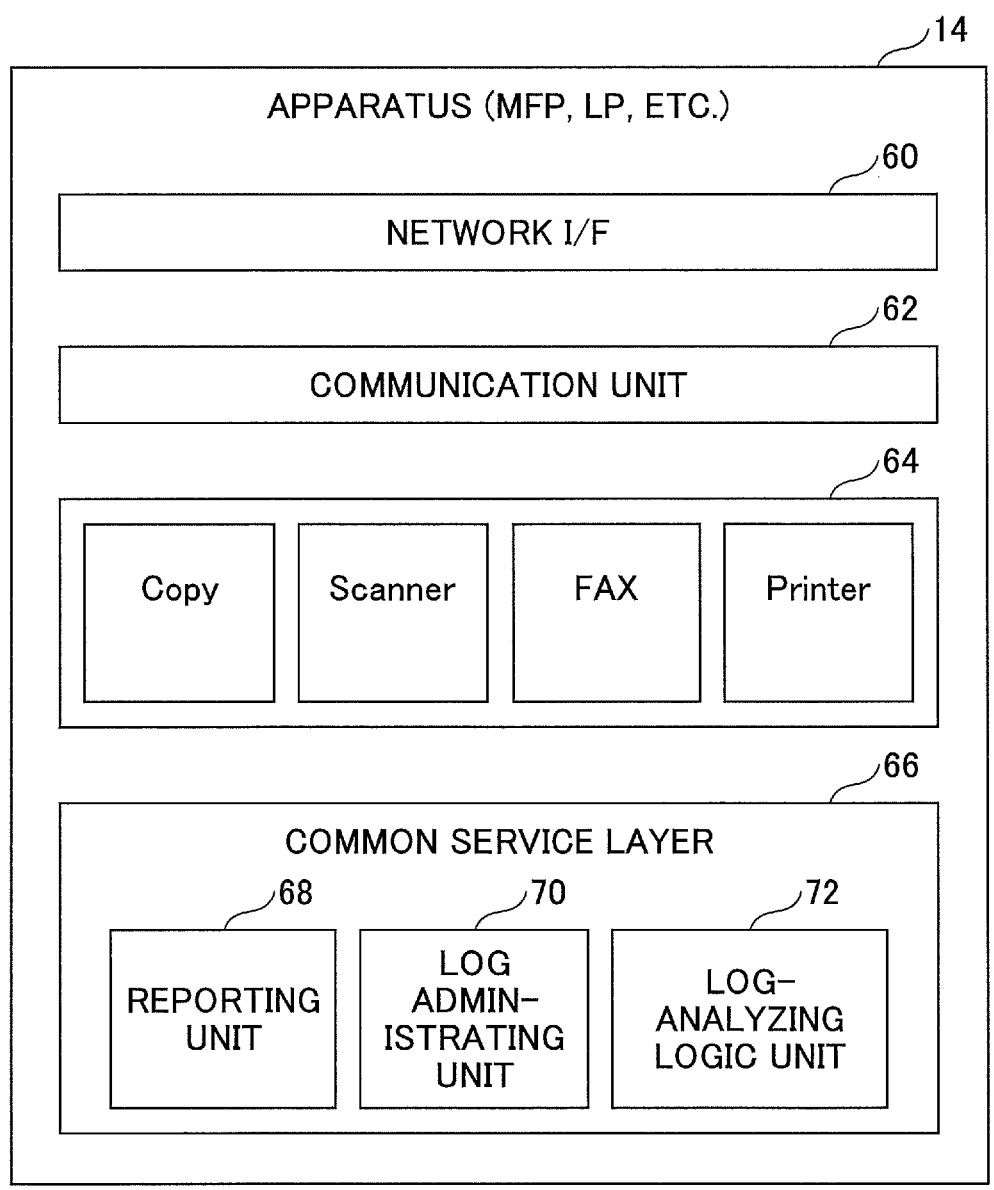
FIG. 6 is a processing block diagram of an exemplary apparatus in the client environment of the embodiment of the present invention.

The apparatus 14 in the client environment 5 of the first embodiment may be implemented by a processing block illustrated in, for example, FIG. 6.

FIG. 6 is a processing block diagram of an exemplary apparatus in the client environment of the first embodiment of the present invention. The apparatus 14 in the client environment 5 implements a network interface (I/F) 60, a communication unit 62, an application (app) layer 64, and a common service layer 66 by executing a program. The common service layer 66 includes a reporting unit 68 and a log administering unit 70, which are used in common by the app layer 64 and so on. FIG. 6 illustrates an example where a log-analyzing logic unit 72 is built into the common service layer 66 of the apparatus 14 as a module of the apparatus 14.

The log administering unit 70 administers the usage log, the debug log, and the other data of the apparatus 14. The log-analyzing logic unit 72 monitors the usage log, the debug log, and another data of the apparatus 14 and reports to the reporting unit 68 in a state where the usage log, the debug log, and the other data of the apparatus 14 matches the content (the condition) of the logic built into the reporting unit 68. Upon receipt of the report from the log-analyzing logic unit 72, the reporting unit 68 conducts a report using a user interface (UI) of each function of the app layer 64, a function limitation to the app layer 64 (e.g., a limitation to a copy function), or the like.

<Detailed Process>

Hereinafter, a detailed process of the information processing system of the first embodiment is described.

<Summary of Process>

FIG. 7 is a diagram illustrating a summary of an exemplary process of the information processing system of the first embodiment of the present invention. FIG. 7 illustrates an example of two client environments of a client A and a client B. In step S11, the information processing apparatuses 12 of the client A and the client B send the usage logs and the debug logs respectively registered from the apparatuses 14 to the cloud service system 10.

In step S12, the cloud service system 10 analyzes at least one of the usage log and the debug log, which are received from the information processing apparatus 12 of the two client environments of the client A and the client B, and generates an algorithm including the logic and predicting the fault such as the error and the failure, as described later. In step S13, the cloud service system 10 builds (feeds back) the generated logic into the product (the on-premise product) in the client environment, as described above.

The on-premise product includes the information processing apparatus 12, the apparatus 14, and the applications 40 installed in the information processing apparatus 12 and the apparatus 14. The on-premise product, into which the logic is built, monitors at least one of the usage log and the debug log of the apparatus 14, and when the condition of the built-in logic is satisfied, the report (an alert) using the UI or the mail delivery, the function limitation of the apparatus 14, or the like can be done.

As described above, in the information processing system 1, the on-premise products in different usage environments or different usage situations are enabled to predict the fault occurring in the apparatus 14 such as the error and the failure.

<Specific Example of Process>

The information processing system 1 of the first embodiment conducts processes in a procedure illustrated in, for example, FIGS. 8A to 10B. FIGS. 8A to 10B are diagrams illustrating an exemplary process of the information processing system of the first embodiment of the present invention. FIGS. 8A to 10B illustrate examples where a usage log received from the client environment of a specific client (the client A) is analyzed to generate a logic, and the generated logic is fed back to the on-premise product of the client A.

For example, referring to FIGS. 8A and 83, the client environment of the client A includes one information processing apparatus 12 and the hundred apparatuses 14. The apparatus 14 performs scanning and sends the scanned data to the information processing apparatus 12. When the scanned data is sent from the information processing apparatus 12 using an email, faults such as an error and a failure are occurring by supposition. In the information processing system 1 of the first embodiment, the logic built into the on-premise product predicts the fault occurring in the apparatus 14 such as the error and the failure to enable avoidance of the faults from frequently occurring.

In step S21, the information processing apparatus 12 sends the usage logs, which are of the apparatus 14 and are registered from the apparatus 14, to the cloud service system 10. For example, a usage log 1000 is stored in the log memory unit 32 of the cloud service system 10. The usage log 1000 is of the apparatus 14 in the client environment of the client A.

The usage log is an example of history information, which includes items of a start time, an end time, function information including at least one job, job information, and status information by each process (each job). For example, the usage log whose function information (Function) is "Scan to Mail" and whose job information is "Email" is an example of a log (history information) of the email delivery included in a scan-to-mail function.

Referring to FIG. 8B, the usage log 1000 indicates whether the job abnormally ends along with the status information of "error" or "finish" or normally ends. Therefore, in the cloud service system 10, the usage log 1000 can be classified into the abnormally ended log and the normally ended log.

In step S22, the cloud service system 10 analyzes the usage log 1000 and generates the logic for predicting the fault such as the error and the failure. For example, the logic is included in an algorithm of a process of outputting an alert when the corresponding condition is satisfied. For example, the cloud service system 10 sets a state where the jobs of the email delivery included in the scan-to-mail function are performed at a rate of 80 jobs or greater per one minute as the condition. The condition indicated in FIG. 8B is an example and ordinarily becomes more complicated.

In step S23, the cloud service system 10 builds (feeds back) the generated logic into the product (the on-premise product) in the client environment, as described below. Here, the logic is built into the on-premise product via the network N1 or is manually built into the on-premise product by a service man.

The on-premise product, into which the logic is built, monitors at least one of the usage log and the debug log of the apparatus 14, and when the condition of the built-in logic is satisfied, the report using the UI or the mail delivery, the function limitation of the apparatus 14, or the like can be done.

After the process illustrated in FIG. 8A, the information processing system 1 of the first embodiment conducts processes illustrated in, for example, FIG. 9A. The usage log 1000 illustrated in FIG. 8B is changed to a usage log 1002 illustrated in FIG. 9B by adding an item "type" indicating a file type due to a version-up of the on-premise product or the like.

In step S31, the information processing apparatus 12 sends the usage logs, to which the items "type" registered from the apparatuses 14 are added, to the cloud service system 10. For example, the usage log 1002 is stored in the log memory unit 32 of the cloud service system 10.

In step S32, the cloud service system 10 analyzes the usage log 1002 and generates the logic for predicting the fault such as the error and the failure. Referring to FIG. 9B, the cloud service system 10 sets a state where the jobs of the email delivery included in the scan-to-mail function are to conduct the email delivery of a document having a file type "PDF" and are performed at a rate of 80 jobs or greater per one minute as the condition. In step S33, the cloud service system 10 builds the generated logic into the on-premise product in the client environment, as described below.

Figure 10A:
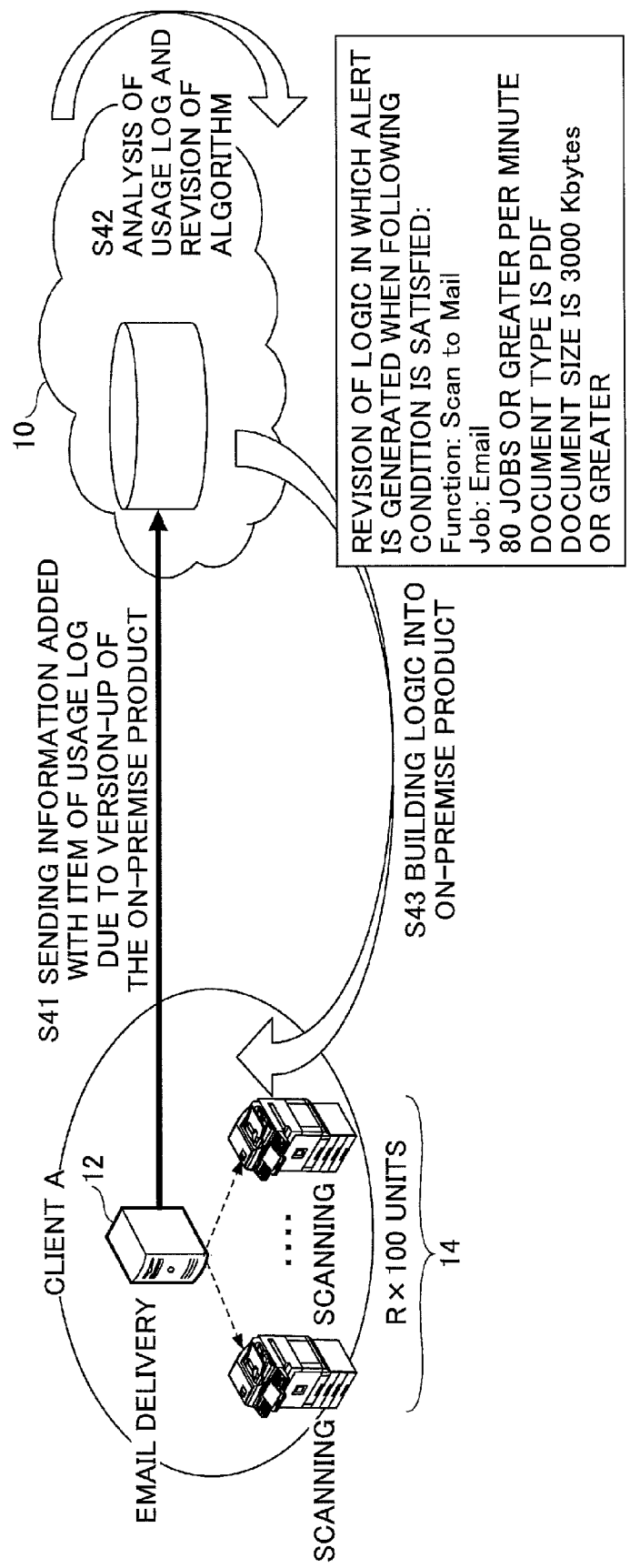

After the process illustrated in FIG. 9A, the information processing system 1 of the first embodiment conducts processes illustrated in, for example, FIG. 10A. The usage log 1002 illustrated in FIG. 8B is changed to a usage log 1004 illustrated in FIG. 10B by adding an item "size" indicating a file size due to the version-up of the on-premise product or the like.

In step S41, the information processing apparatus 12 sends the usage logs, to which the items "size" registered from the apparatuses 14 are added, to the cloud service system 10. For example, the usage log 1004 is stored in the log memory unit 32 of the cloud service system 10. In step S42, the cloud service system 10 analyzes the usage log 1004 and generates the logic for predicting the fault such as the error and the failure.

Referring to FIG. 10B, the cloud service system 10 sets a state where the jobs of the email delivery included in the scan-to-mail function are to conduct the email delivery of a document having the file type "PDF" and a file sized and are performed at a rate of 80 jobs or greater per one minute as the condition. In step S43, the cloud service system 10 builds the generated logic into the on-premise product in the client environment, as described below.

As illustrated in FIG. 8A to 10B, in the information processing system, the usage log is analyzed at each addition of the item of the usage log and the logic for predicting an occurrence of the fault is generated, it is possible to increase a prediction accuracy.

(Log Registration Process)

Figure 11:
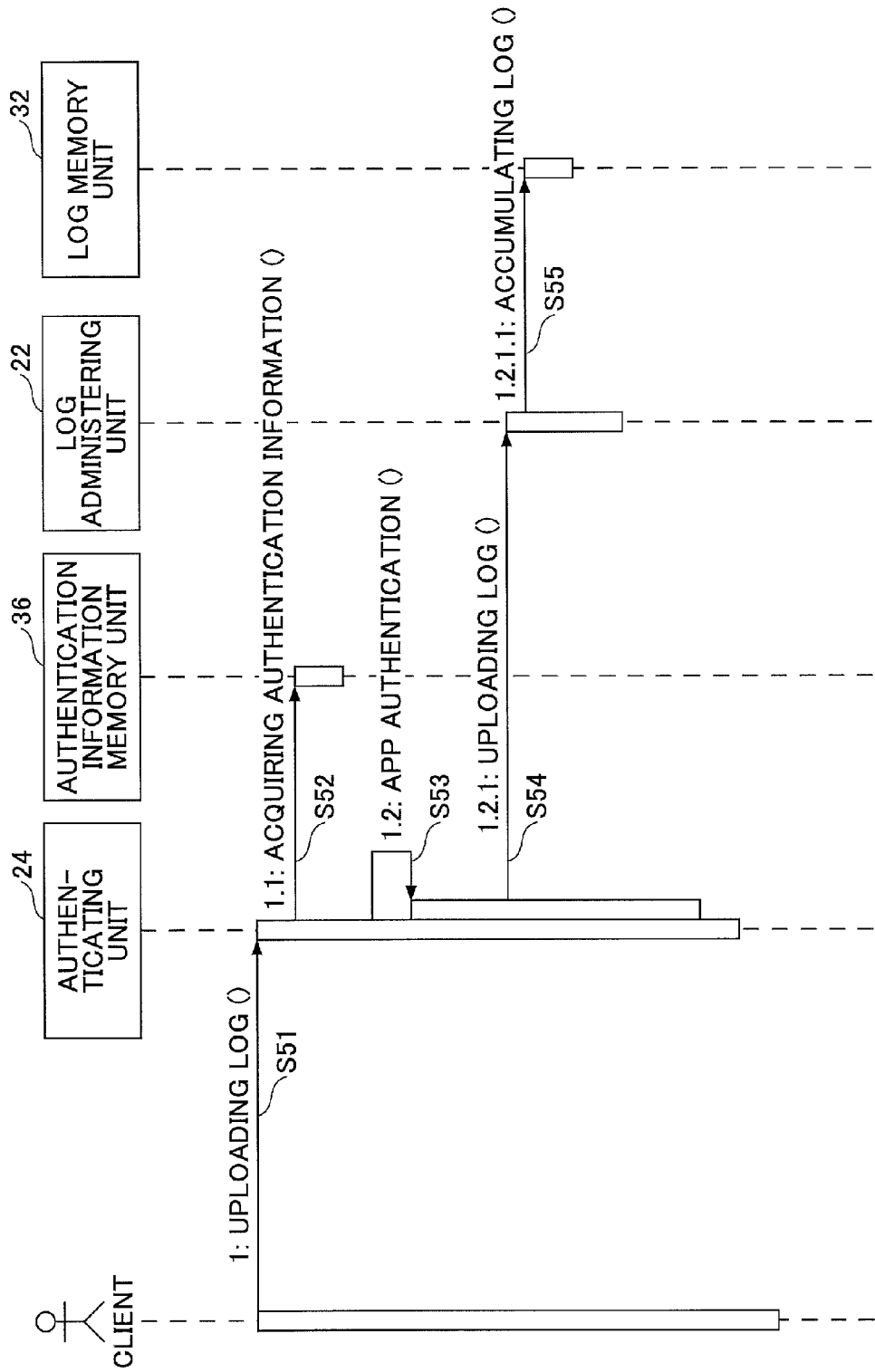
FIG. 11 is a sequence diagram illustrating an exemplary log registration process of registering a log in the cloud service system.

FIG. 11 is a sequence diagram illustrating an exemplary log registration process of registering the log in the cloud service system. The client illustrated in FIG. 11 corresponds to the information processing apparatus 12 which belongs to the client environment and uploads the usage log to the cloud service system 10. However, when the apparatus 14 uploads the usage log to the information processing apparatus 12, the client illustrated in FIG. 11 instead corresponds to the apparatus 14.

In step S51, the information processing apparatus 12 as the example of the client sends the usage logs, which are of the apparatuses 14 and are registered from the apparatuses 14, to the cloud service system 10, and requests to upload the usage logs.

In step S52, the authenticating unit 24 of the cloud service system 10 acquires authentication information from the authentication information memory unit 36. In step S53, the authenticating unit 24 uses the acquired authentication information and performs an app authentication for a request source which requests to upload the log.

In response to a successful app authentication, the authenticating unit 24 sends the request to upload the log from the information processing apparatus 12 to the log administering unit 22. In step S55, the log administering unit 22 accumulates the usage log sent from the information processing apparatus 12 into the log memory unit 32 based on the received request to upload the log.

In response to an unsuccessful app authentication, the authenticating unit 24 does not send the request to upload the log from the information processing apparatus 12 to the log administering unit 22. Therefore, in response to the unsuccessful app authentication, the usage log sent from the information processing apparatus 12 is not accumulated into the log memory unit 32.

Figure 12A:
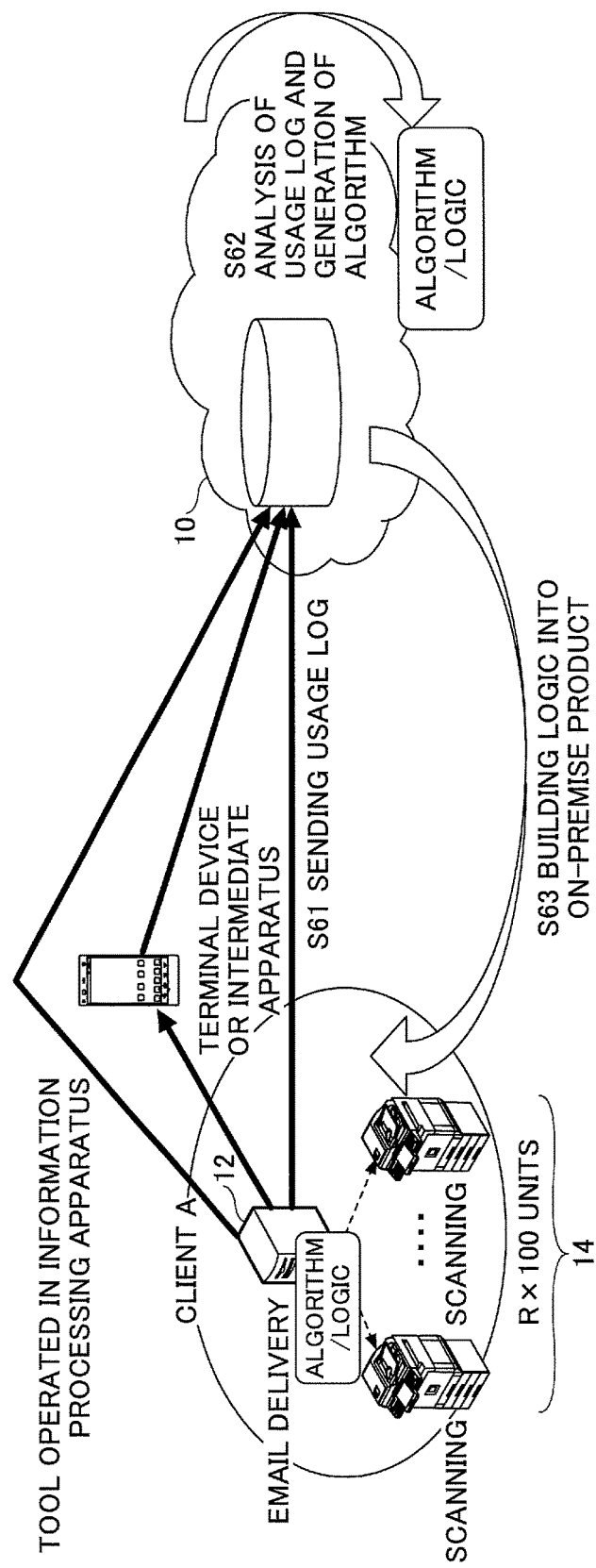

The usage log may be sent to the cloud service system 10 as illustrated in, for example, FIGS. 12A and 12B. FIG. 12A and 12B are diagrams illustrating another exemplary log registration process of registering the log in the cloud service system.

In step S61, for example, a tool operated in the information processing apparatus 12, a terminal device, or an intermediate apparatus acquires the usage log from the on-premise product and sends the acquired usage log to the cloud service system 10. For example, the usage log 1004 is stored in the log memory unit 32 of the cloud service system 10. Because the processes of steps S62 and S63 are similar to the processes of steps S42 and S43 of FIG. 10A, explanation of the processes of steps S62 and S63 is omitted.

As described above, the log registration process from the client environment to the cloud service system 10 may have various variations.

(Analysis of Usage Log and Logic Generation)

Figure 13:
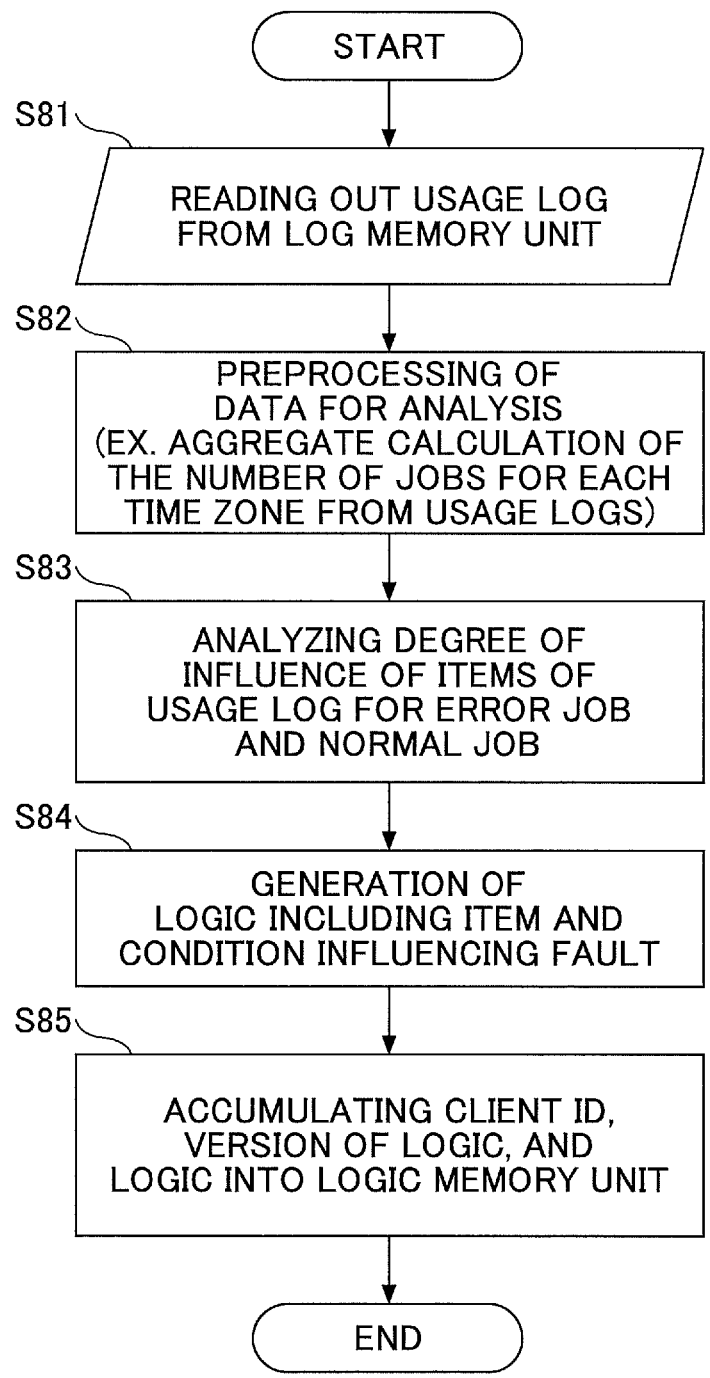
FIG. 13 is a flowchart illustrating an exemplary analysis of a usage log and an exemplary process of logic generation.

The cloud service system 10 analyzes the usage log and generates the logic for predicting the fault as illustrated in, for example, FIG. 13.

FIG. 13 is a flowchart illustrating an exemplary analysis of the usage log and an exemplary process of logic generation;

In step S81, the log analyzing unit 28 of the cloud service system 10 reads out the usage log from the log memory unit 32. In step S82, the log analyzing unit 28 performs preprocessing of the usage log for the analysis. The preprocessing is a process such as an aggregate calculation of the number of the jobs for each time zone from the usage logs.

In step S83, the log analyzing unit 28 analyzes a degree of influence of the items of the usage logs for an error job whose status information is "error" and a normal job whose status information is "finish". In step S83, a known analytical method such as regression analysis, decision tree analysis, and machine learning can be used depending on an intended purpose of the logic generation.

In step S84, the logic generating unit 26 generates the logic including the at least one item and the condition corresponding to the at least one item, which influence the fault such as the error and the failure, based on the degree of influence of each item obtained by analyzing the usage logs by the log analyzing unit 28. In step S85, the logic generating unit 26 associates the logic generated in step S64 with a client ID and the version of the logic, and causes the associated logic, client ID, and version of the logic to be accumulated in the logic memory unit 30.

Figure 14:
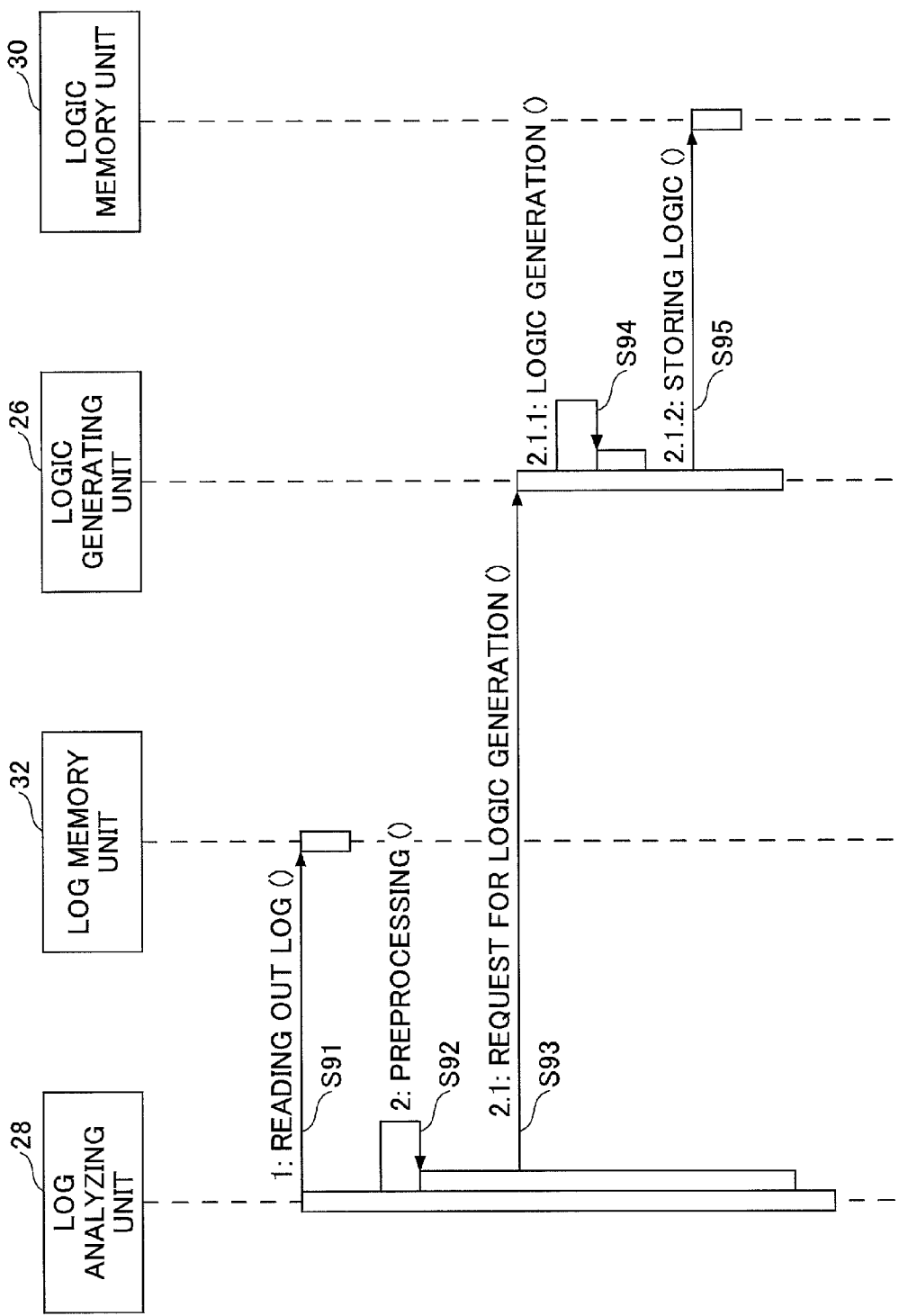
FIG. 14 is a sequence diagram illustrating an exemplary analysis of a usage log and an exemplary process of logic generation.

FIG. 14 is a sequence diagram illustrating an exemplary analysis of the usage log and an exemplary process of logic generation. The process illustrated in the sequence diagram of FIG. 14 is performed asynchronously with the log registration process illustrated in FIG. 11. In step S91, the log analyzing unit 28 reads out the usage log from the log memory unit 32.

In step S92, the log analyzing unit 28 performs preprocessing of the usage log for, for example, the analysis such as the aggregate calculation of the number of the jobs for each time zone obtained from the usage log. The log analyzing unit 28 analyzes the degree of influence of each item of the usage log by the known analytical method. In step S93, the log analyzing unit 28 requests the logic generating unit to perform the logic generation.

In step S94, the logic generating unit 26 receives the logic generation request from the log analyzing unit 28, and generates the logic including the at least one item and the condition corresponding to the at least one item, which influence the fault such as the error and the failure, based on the degree of influence of each item obtained by analyzing the usage logs by the log analyzing unit 28.

In step S95, the logic generating unit 26 associates the logic generated in step S94 with the client ID and the version of the logic, and causes the associated logic, client ID, and version of the logic to be accumulated in the logic memory unit 30.

(Check and Update of Logic)

Figure 15:
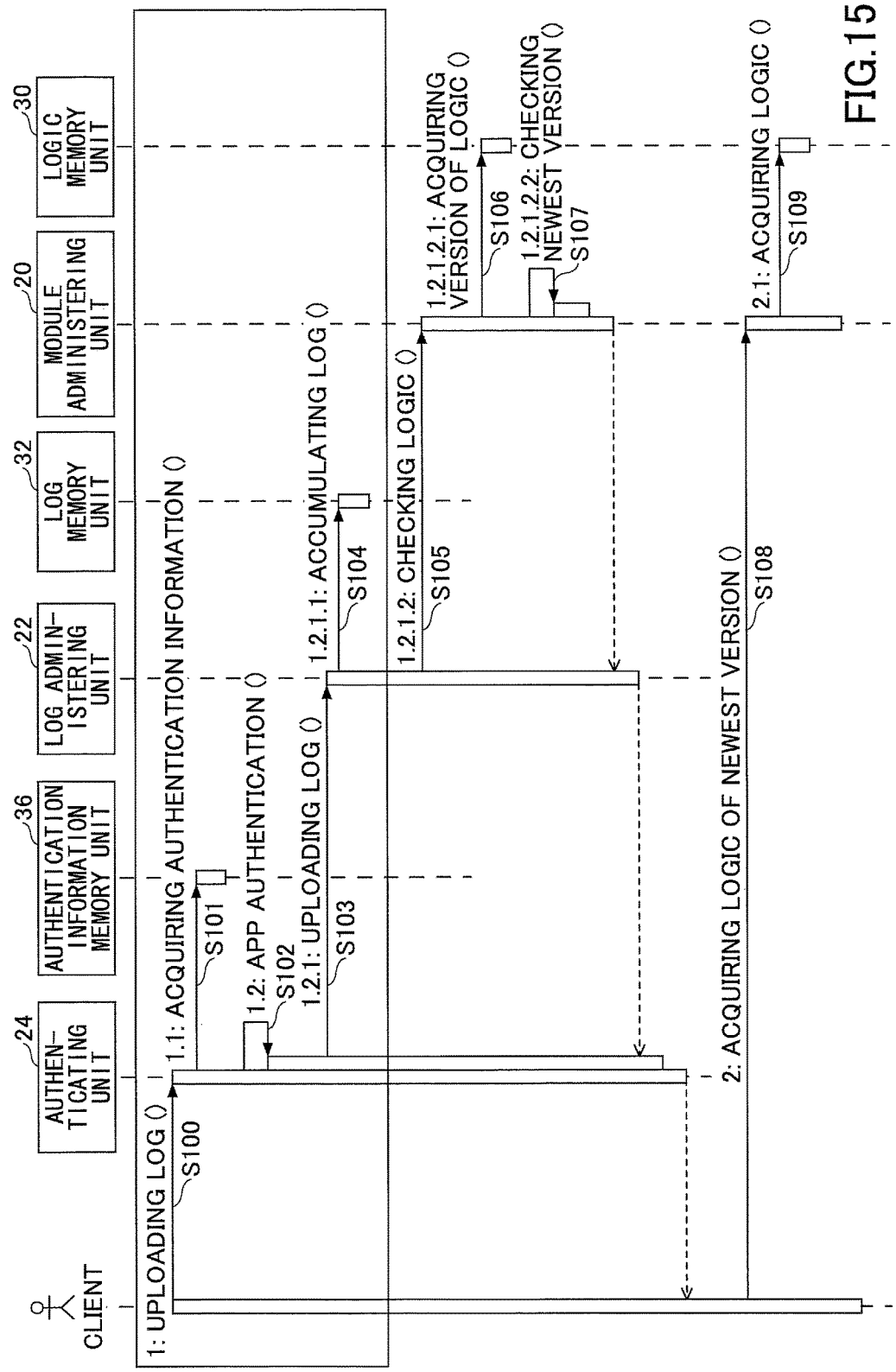
FIG. 15 is a sequence diagram illustrating an exemplary process of checking and updating a logic.

The information processing system 1 of the first embodiment checks and updates the logic according to, for example, a process illustrated in FIG. 15. FIG. 15 is a sequence diagram illustrating an exemplary process of checking and updating the logic.

Because the processes of steps S100 to S104 are similar to the processes of steps S51 to S55 of FIG. 11, explanation is omitted. After accumulating the usage log into the log memory unit 32, the log administering unit 22 requests the module administering unit 20 to check the logic is step S105.

In step S106, the module administering unit 20 receives the request to check the logic and acquires the version of the logic from the logic memory unit 30. For example, the logic memory unit 30 associates the logic with the client ID and the version of the logic and accumulates the associated logic, client ID, and version of the logic as illustrated in FIG. 16.

FIG. 16 illustrates a structure of exemplary accumulated data accumulated by the logic memory unit. As illustrated in FIG. 16, the logic memory unit 30 accumulates accumulated data in which the ID, a time and date of update, the version of the logic, an entity of the logic, and applied client are associated. The ID is identification information of the accumulated data. The time and date of update represents a time and date when the accumulated data are updated. The entity of logic represents an entity of the logic. The applied client represents identification information of the information processing apparatus 12 and the apparatus 14, into which the logic is built.

In step S107, the module administering unit 20 checks whether the newest version (i.e., a newer version newer than the version of the logic built in the client) exists by referring to the version of the logic acquired from the logic memory unit 30. Then, the module administering unit 20 reports an issue whether the newest version of logic exists to the information processing apparatus 12, which is the client, through the log administering unit 22 and the authenticating unit 24.

If the newest version of logic exists, the clients proceeds to step S108 and requests the module administering unit 20 of the cloud service system 10 to acquire the logic of the newest version of logic. The module administering unit 20 acquires the logic of the newest version from the logic memory unit 30, and sends the acquired logic of the newest version to the client.

Referring to FIG. 15, the information processing apparatus 12, which is the client, checks whether the newest version of logic exists at a timing of uploading the usage log to the cloud service system 10 and can acquire the logic of the newest version.

(Building Logic into On-Premise Product)

Figure 17:
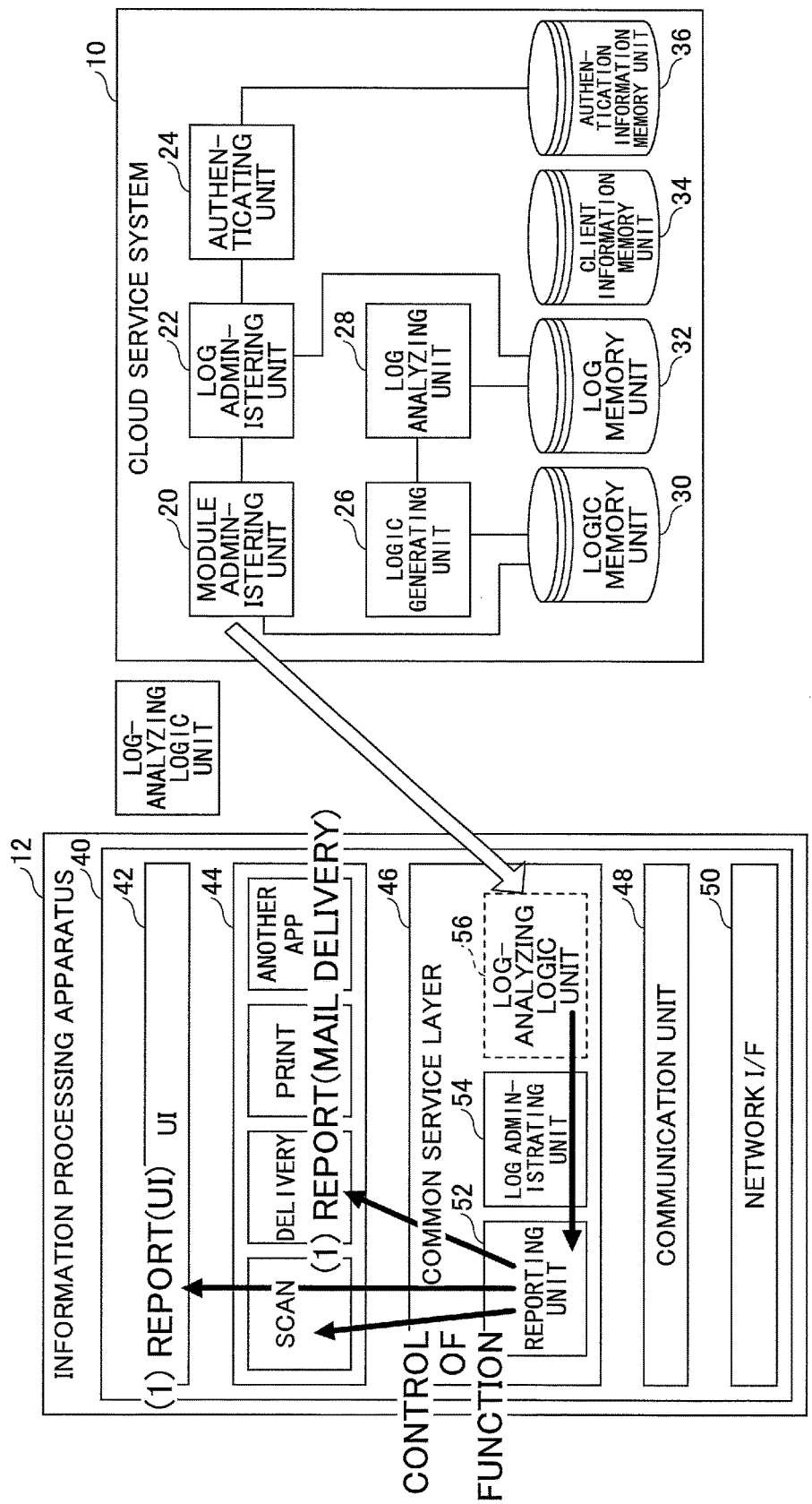
FIG. 17 is a diagram illustrating an exemplary process of building a logic as a module into an application installed in the information processing apparatus.

FIG. 17 is a diagram illustrating an exemplary process of building the logic as the module into the application installed in the information processing apparatus. The module administering unit 20 of the cloud service system 10 illustrated in FIG. 17 builds the log-analyzing logic unit 56 as the logic into the application 40 installed in the information processing apparatus 12.

Figure 18:
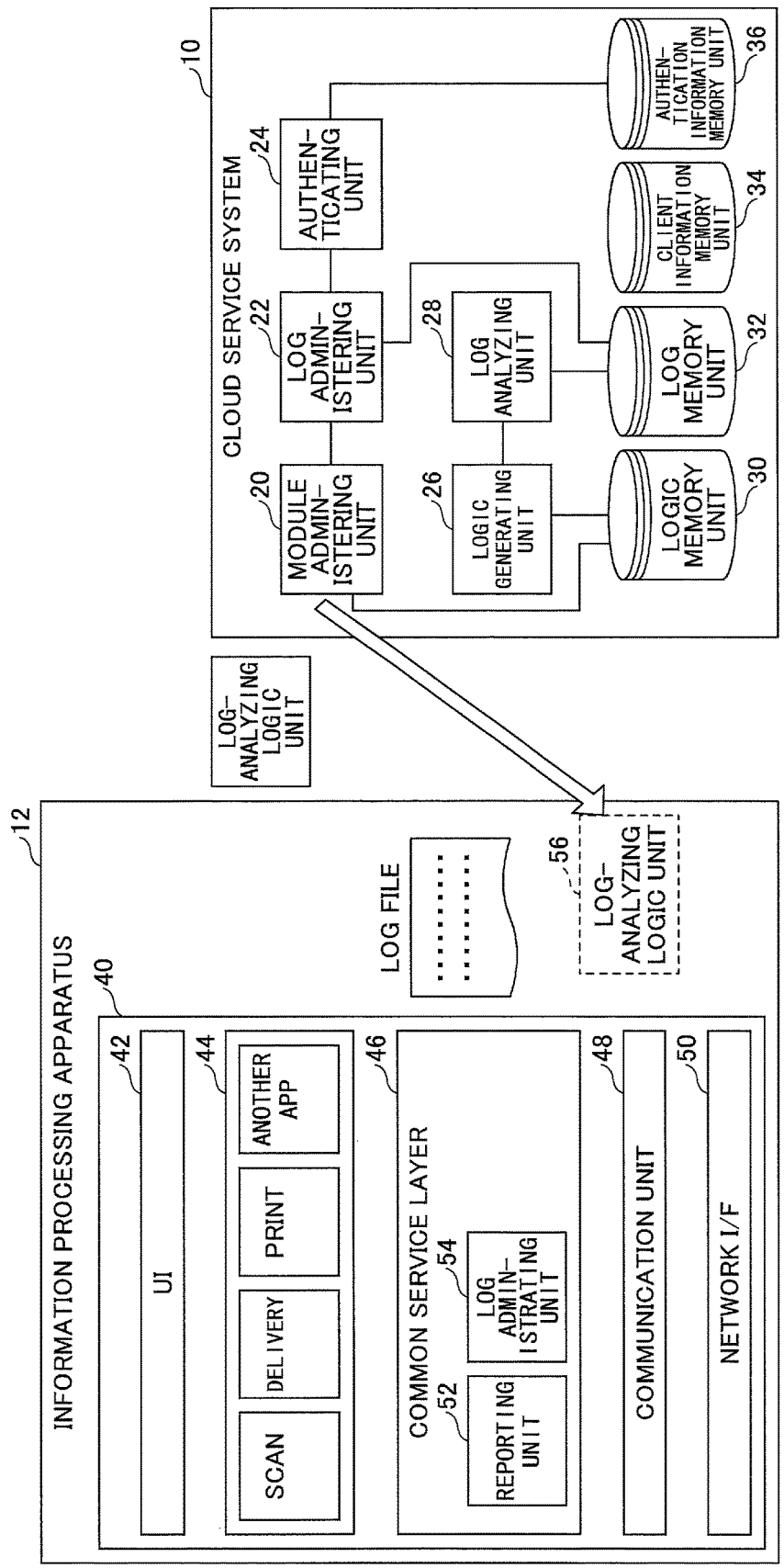
FIG. 18 is a diagram illustrating an exemplary process of providing the built-in logic as an external module of an application installed in the information processing apparatus.

The log-analyzing logic unit 56 built into the information processing apparatus 12 monitors the usage log of the apparatus 14 and reports to the reporting unit 52 in a state where the usage log of the apparatus 14 matches the condition of the logic. The reporting unit 52 performs a report by the UI 42, a report by a mail delivery by the delivery unit of the app layer 44, a function control of temporarily limit a use of a function (i.e., a scan function and so on) of the app layer 44, and so on. FIG. 18 is a diagram illustrating an exemplary process of providing the built-in logic as an external module of the application installed in the information processing apparatus. The module administering unit 20 of the cloud service system 10 illustrated in FIG. 18 builds the log-analyzing logic unit 56 as the logic into the application 40 installed in the information processing apparatus 12.

Figure 19:
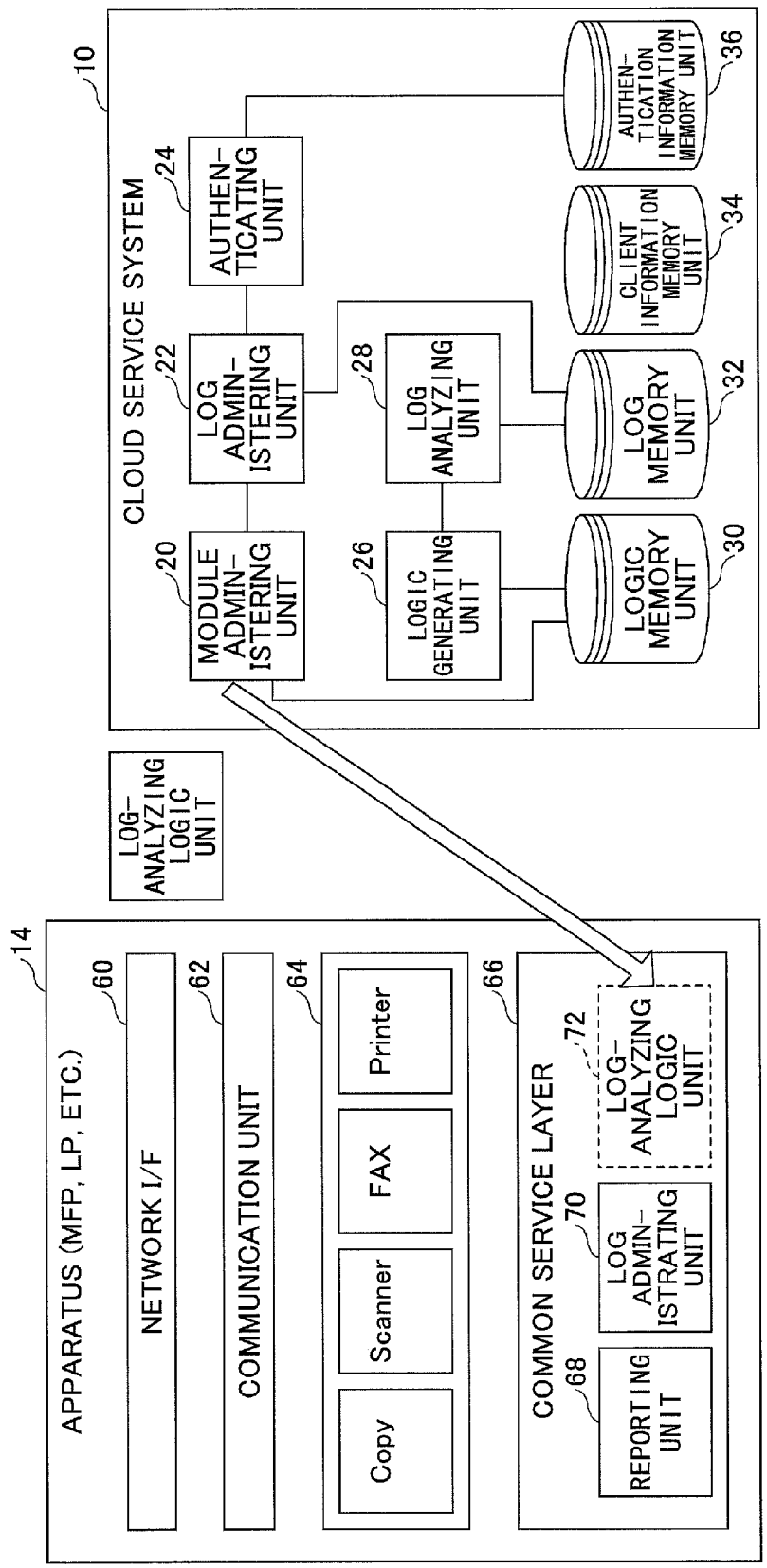
FIG. 19 is a diagram illustrating an exemplary process of providing the built-in logic as a module of an apparatus.

FIG. 19 is a diagram illustrating an exemplary process of providing the built-in logic as the module of the apparatus. The module administering unit 20 of the cloud service system 10 illustrated in FIG. 19 builds the log-analyzing logic unit 72 as the logic into the common service layer 66 of the apparatus 14.

Figure 20:
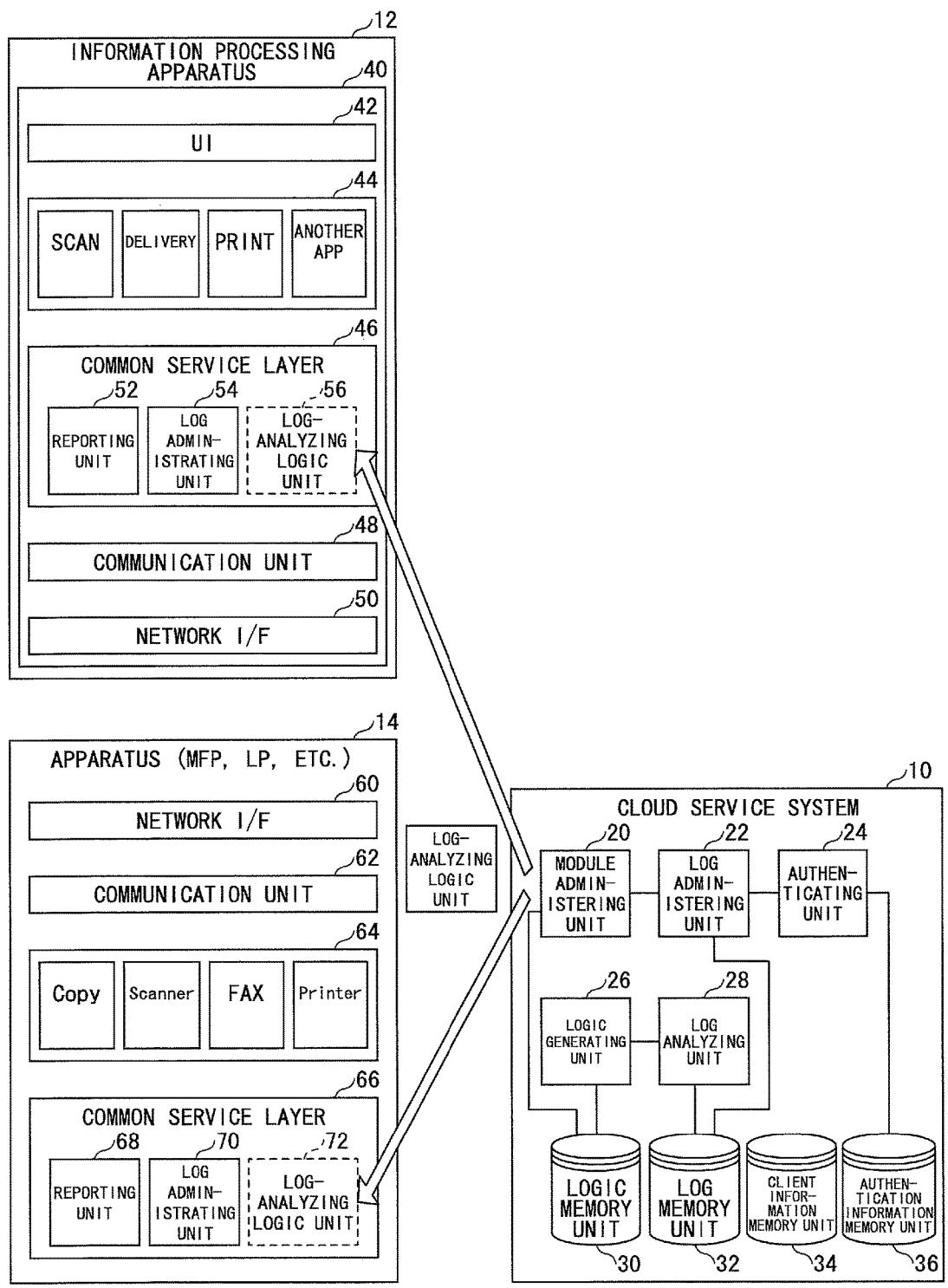
FIG. 20 is a diagram illustrating an exemplary process of building the logic into both the information processing apparatus and the apparatus.

FIG. 20 is a diagram illustrating an exemplary process of building the logic into both the information processing apparatus and the apparatus. The module administering unit 20 of the cloud service system 10 illustrated in FIG. 20 builds the log-analyzing logic unit 56 as the logic into the application 40 installed in the information processing apparatus 12. The module administering unit 20 builds the log-analyzing logic unit 72 as the logic into the common service layer 66 of the apparatus 14. The log-analyzing logic unit 56 built in the information processing apparatus 12 and the log-analyzing logic unit 72 built in the apparatus 14 collaborate and process.

(Specific Examples of Analysis of Usage Log and Logic Generation)

Figure 21A:
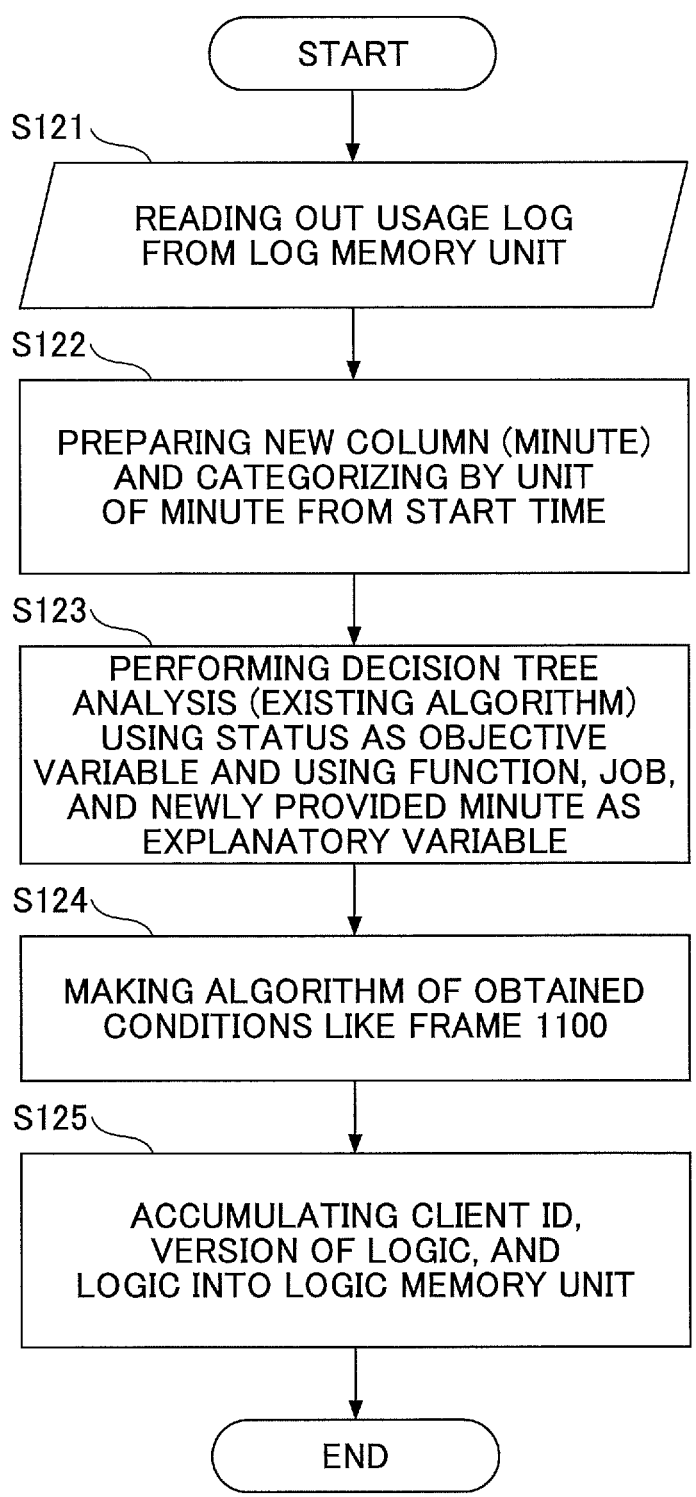
Figure 21D:
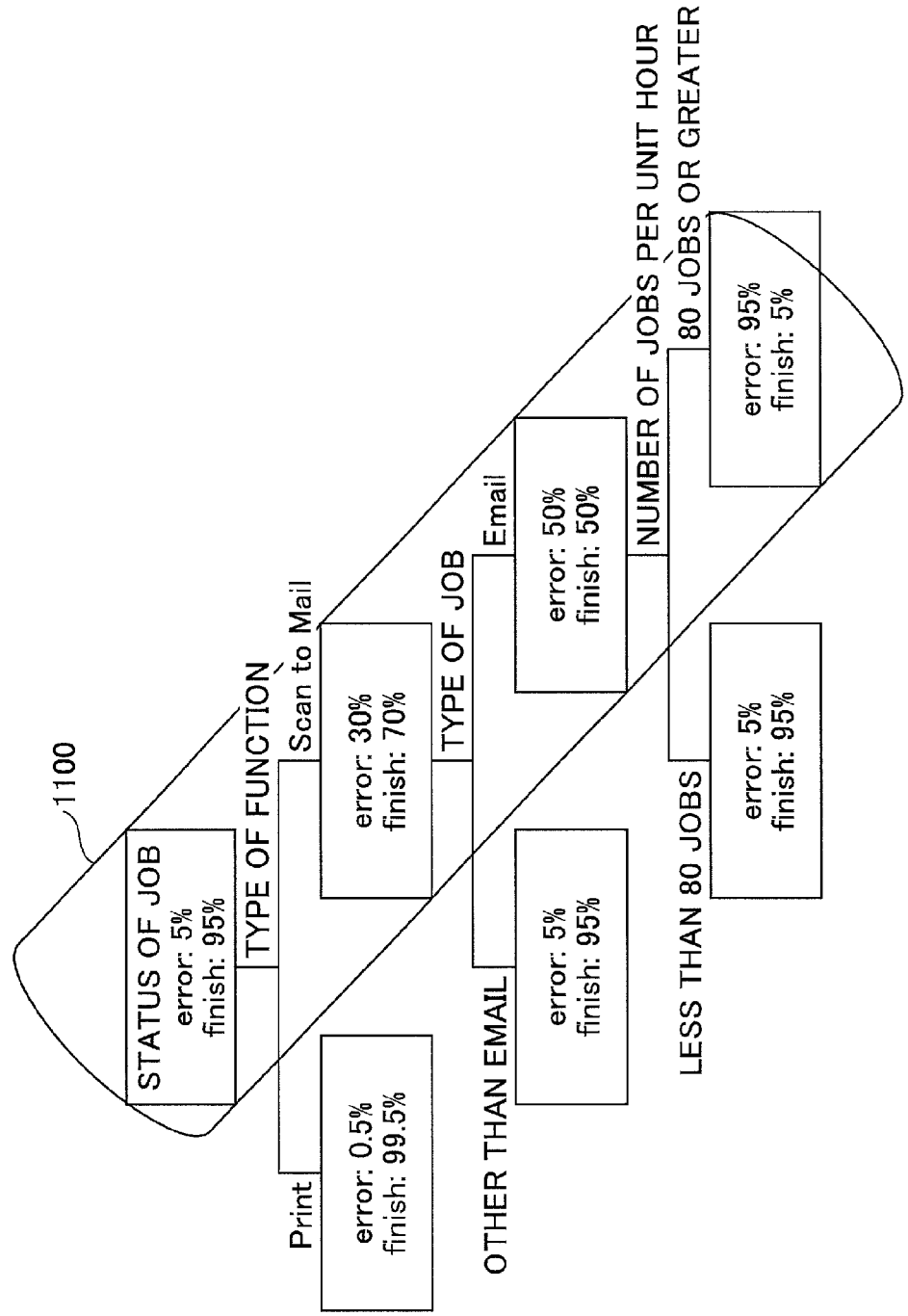

The processes of the analysis of the usage log and the logic generation described above are conducted as illustrated in, for example, FIG. 21. FIGS. 21A-21E are diagrams illustrating an exemplary analysis of the usage log and an exemplary process of logic generation.

In step S121, the log analyzing unit 28 of the cloud service system 10 reads out the usage log 1000 illustrated in, for example, FIG. 21B from the log memory unit 32. In step S122, the log analyzing unit 28 performs preprocessing of the usage log for the analysis as illustrated in, for example, FIG. 21C. In the preprocessing, minute information is added as a new item to the usage log 1000, and the usage log is categorized by a unit of each minute from a start time.

In steps S123 and S124, as illustrated in FIG. 21D, the log analyzing unit 28 performs a decision tree analysis using the status information as an objective variable and using the function information, the job information, and the minute information as explanatory variables. In the decision tree analysis illustrated in FIG. 21D, an option having a greater ratio of status information (i.e., objective variable) of "Error" to generate the logic (included in the algorithm) which includes the condition surrounded by a frame 1100.

In a process illustrated in FIG. 21A, in a case where the condition is that the rate of jobs of an email delivery included in a scan-to-mail function is equal to or greater than 80 jobs and this condition is satisfied, a logic outputting an alert is generated as illustrated in FIG. 21E. As described, the above described analysis of the usage log and the above process of the logic generation can be automated using the known analytical method.

In step S125, the logic generating unit 26 associates the logic generated in step S124 with the client ID and the version of the logic, and causes the associated logic, client ID, and version of the logic to be accumulated in the logic memory unit 30.

<General Overview>

According to the first embodiment, the information processing system 1 enabling the logic based on the usage log acquired from the apparatus 14 to be built into the client environment side can be provided.

Second Embodiment

Within the first embodiment, the usage logs are collected from each client environment and the logic is generated for each client environment. The generated logic is built in the client environment from which the usage logs are collected. Within the second embodiment, the usage logs are collected from multiple client environments and the logic is generated using the usage logs from the multiple client environments. The generated logic is built in these multiple client environments. Because the second embodiment is similar to the first embodiment except for a part of the second embodiment, explanation is appropriately omitted.

Figure 22:
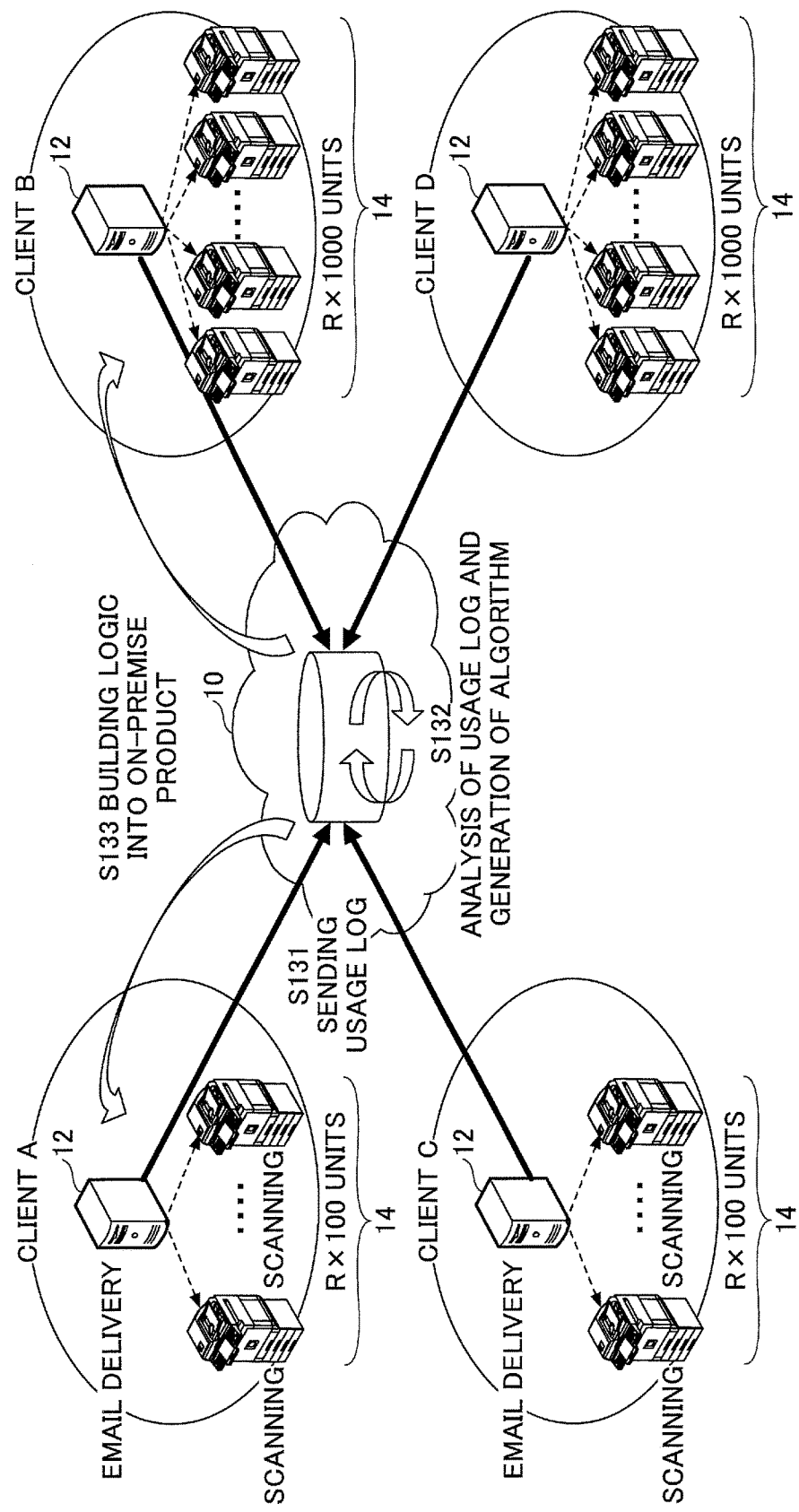
FIG. 22 is a diagram illustrating a summary of an exemplary process of the information processing system of a second embodiment of the present invention.

FIG. 22 is a diagram illustrating a summary of an exemplary process of the information processing system of the second embodiment of the present invention. FIG. 22 illustrates an example of four client environments of clients A to D. Referring to FIG. 22, each client environment of the clients A and C includes 100 units of the apparatuses, and each client environment of the clients B and D includes 1000 units of the apparatuses.

In step S131, the information processing apparatuses 12 of the clients A to D send the usage logs, which are of the apparatuses 14 and are registered from the apparatuses 14, to the cloud service system 10.

In step S132, the cloud service system 10 analyzes the usage logs, which are received from the information processing apparatus 12 of the four client environments of the clients A to D, and generates the logic (included in the algorithm) for predicting the fault such as the error and the failure, as described above. In step S133, the cloud service system 10 builds the generated logic into the products (the on-premise products) on the client environment side of the clients A to D.

The on-premise product, into which the logic is built, monitors the usage log of the apparatus 14, and when the condition of the built-in logic is satisfied, the report using the UI or the mail delivery can be done.

While the apparatus 14 performs scanning and sends the scanned data to the information processing apparatus 12, and the scanned data is sent from the information processing apparatus 12 using the email, faults such as the error and the failure are occurring by supposition.

Figure 23:
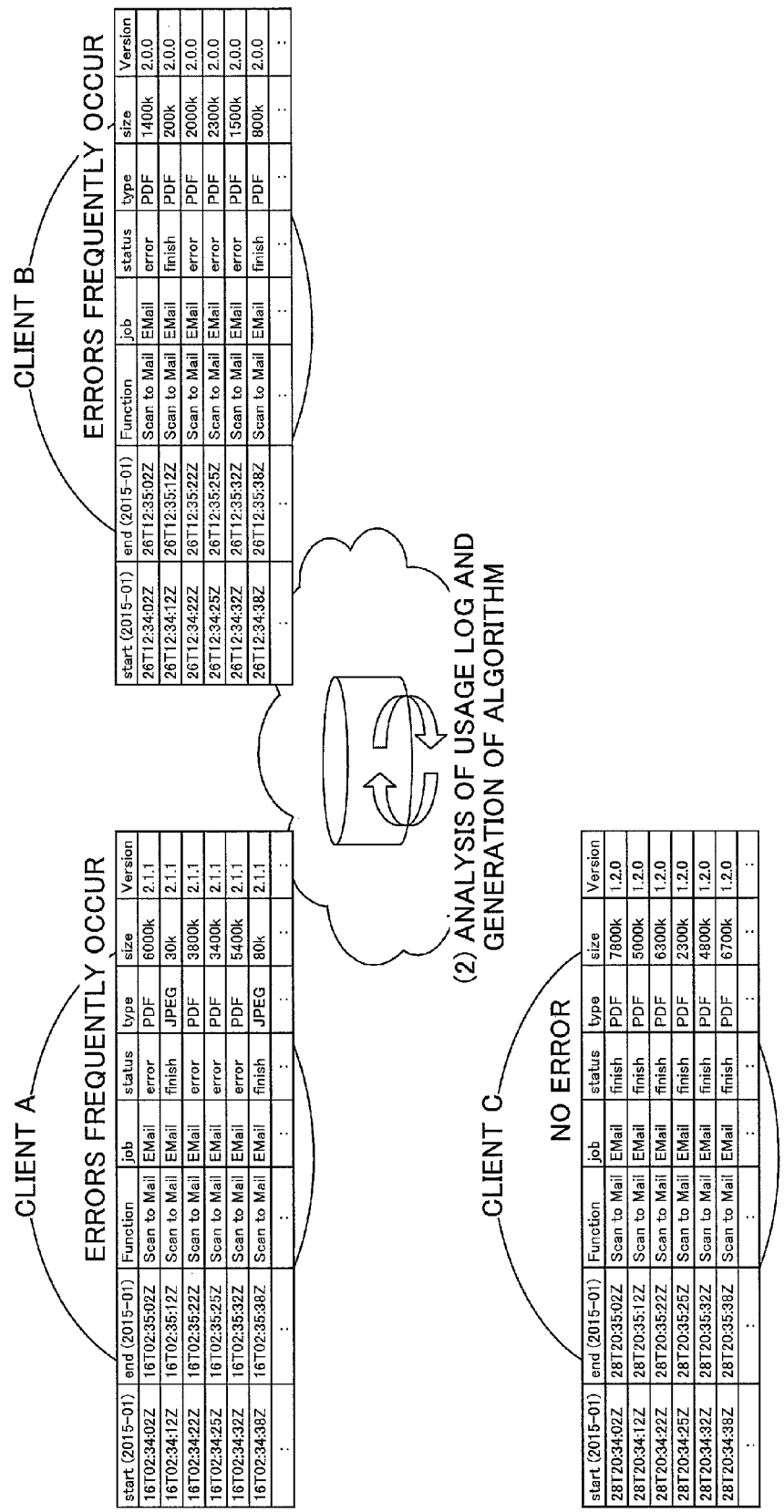
FIG. 23 is a diagram illustrating an exemplary usage log registered from client environments of clients A, B, and C into the cloud service system 10.

FIG. 23 is a diagram illustrating an exemplary usage log registered from client environments of clients A, B, and C into the cloud service system 10. In a case where only the usage logs registered from the client environment of the client A are analyzed to generate the logic, the content of the generated logic is as follows.

Content of Logic:
function information "Scan to Mail"
job information "Email"
file type "PDF"
file size "3000 kbyte or greater"
80 jobs or greater per minute In a case where the usage logs registered from the client environments of the clients B and C are analyzed to generate the logic, the content of the generated logic is as follows.

Content of Logic:
function information "Scan to Mail"
job information "Email"
file type "PDF"
version information "2.*.* system"
80 jobs or greater per minute As illustrated in FIG. 23, in a case where the usage logs registered from the client environments of the client A to client C are analyzed to generate the logic, a file size does not interfere with the occurrence of the fault but the version information interferes with the occurrence of the fault.

Figure 24:
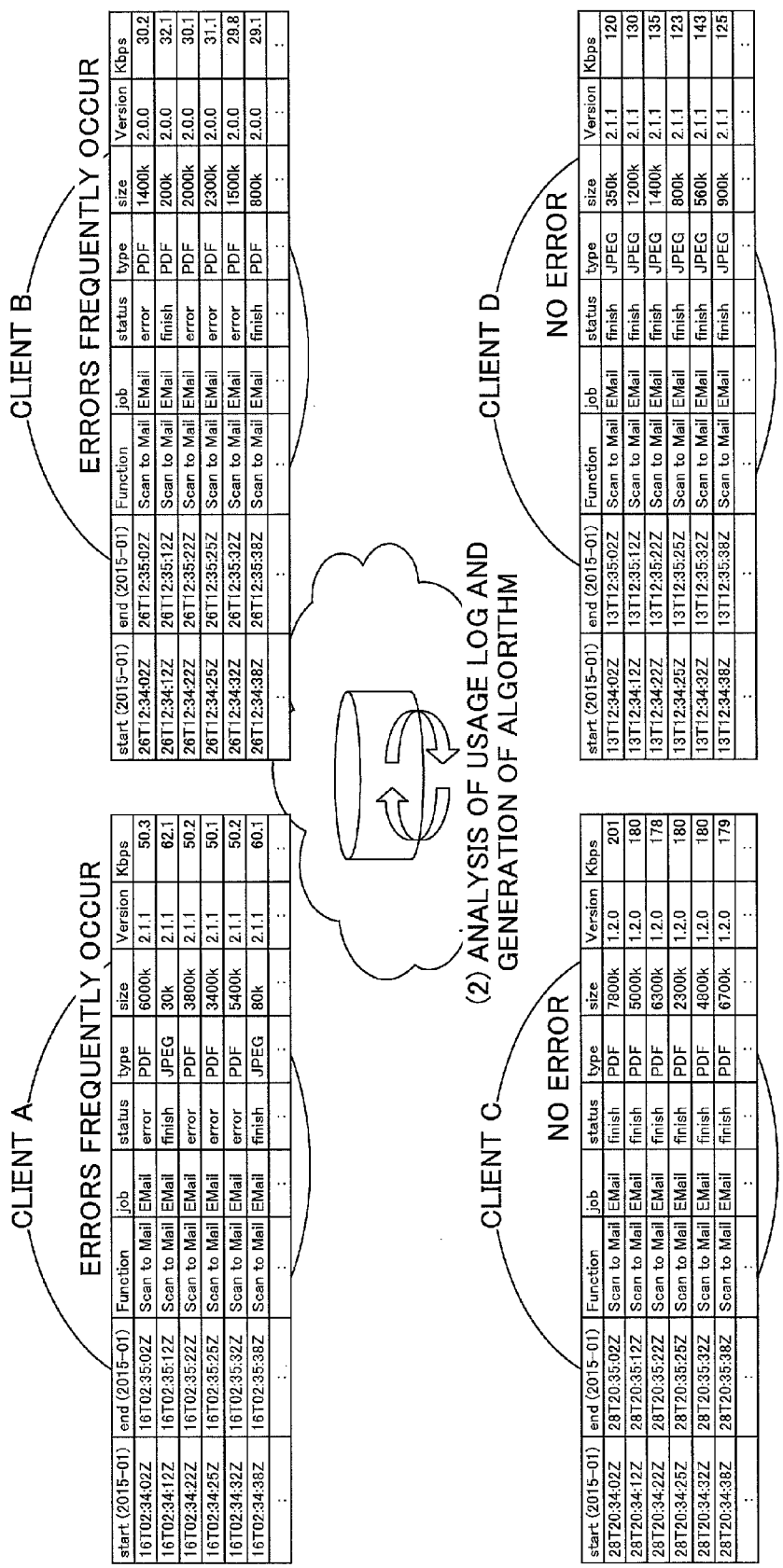
FIG. 24 is a diagram illustrating an exemplary usage log registered from client environments of clients A, B, C, and D into the cloud service system 10.

FIG. 24 is a diagram illustrating an exemplary usage log registered from client environments of clients A, B, and C into the cloud service system 10. In a case where the usage logs registered from the client environments of the client A to the client D are analyzed to generate the logic, the content of the generated logic is as follows.

Content of Logic:
function information "Scan to Mail"
job information "Email"
file type "PDF"
line speed "65 Kbps or less"
80 jobs or greater per minute As illustrated in FIG. 24, in a case where the usage logs registered from the client environments of the client A to client C are analyzed to generate the logic, the version information does not interfere with the occurrence of the fault but the line speed interferes with the occurrence of the fault.

Figure 25:
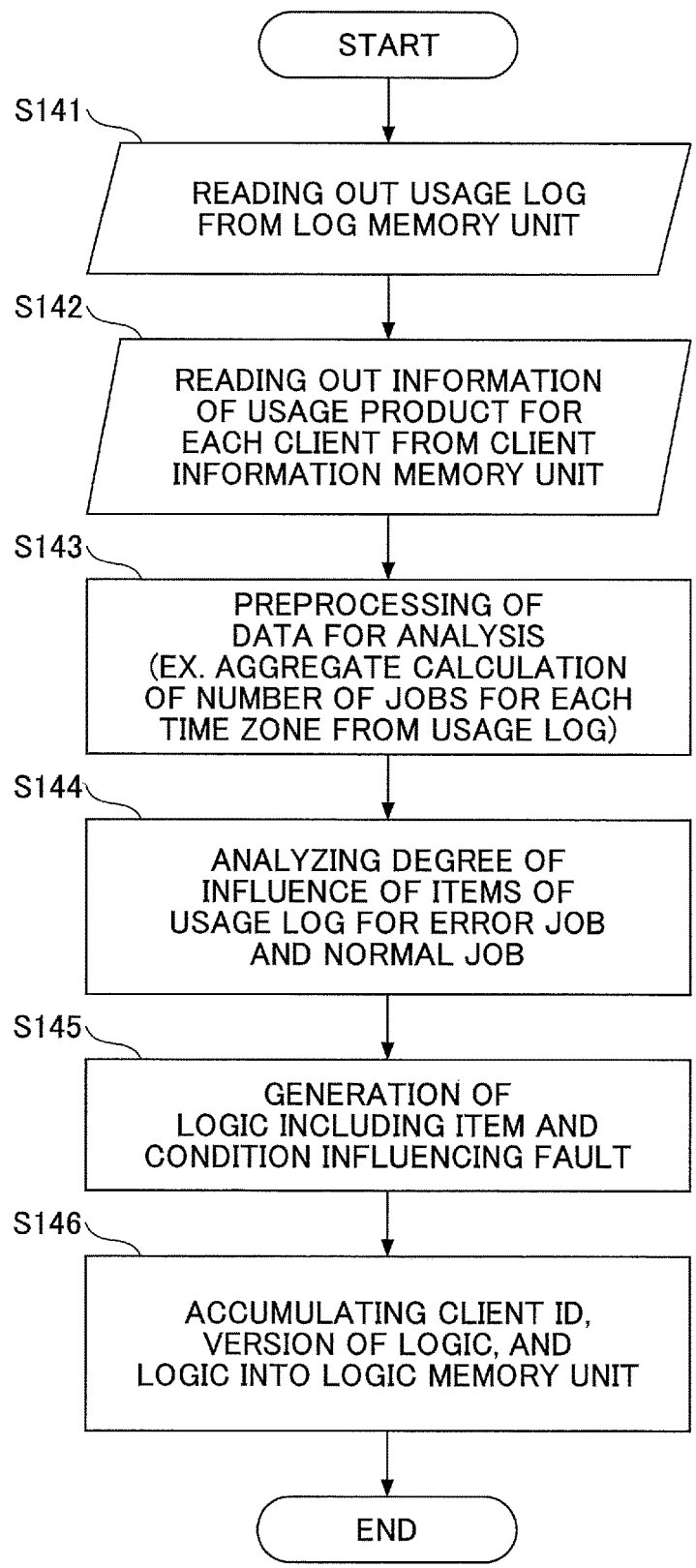
FIG. 25 is a flowchart illustrating another exemplary analysis of the usage log and another exemplary process of logic generation.

The analysis of the usage logs registered from the multiple client environments and the logic generation are conducted by a process illustrated in, for example, FIG. 25. FIG. 25 is a flowchart illustrating another exemplary analysis of the usage logs and another exemplary process of logic generation.

In step S141, the log analyzing unit 28 of the cloud service system 10 reads out the usage logs from the log memory unit 32. In step S142, the log analyzing unit 28 reads out the information of used on-premise product for each client from client information memory unit 34. In step S143, the log analyzing unit 28 performs preprocessing of the usage logs for the analysis.

In step S144, the log analyzing unit 28 analyzes a degree of influence of the items of the usage logs for an error job whose status information is "error" and a normal job whose status information is "finish".

In step S145, the logic generating unit 26 generates the logic including the at least one item and the condition corresponding to the at least one item, which influence the fault such as the error and the failure, based on the degree of influence of each item obtained by analyzing the usage logs by the log analyzing unit 28. In step S146, the logic generating unit 26 associates the logic generated in step S145 with the client ID and the version of the logic, and causes the associated logic, client ID, and version of the logic to be accumulated in the logic memory unit 30.

<General Overview>

Within the second embodiment, the usage logs are collected from multiple client environments and the logic is generated using the usage logs from the multiple client environments. The generated logic is built in these multiple client environments.

Third Embodiment

In the information processing system 1 of the third embodiment, at least one of the function, the log (a schema), and the logic of the at least one on-premise product in each client environment may not be updated all at once. Therefore, each client environment may include various combinations of the function, the log (a schema), and the logic of the at least one on-premise product such that the function of the on-premise product remains old, only the log (the schema) is updated, and only the logic is updated. In the combinations of the function, the log (the schema), and the logic, there may be a case where the logic is effective and a case where the logic is ineffective.

Within the third embodiment, a version is given to each of the function, the log (the schema), and the logic, and a combination of the versions is used to enable the optimum logic to be built in the on-premise product.

Figure 26:
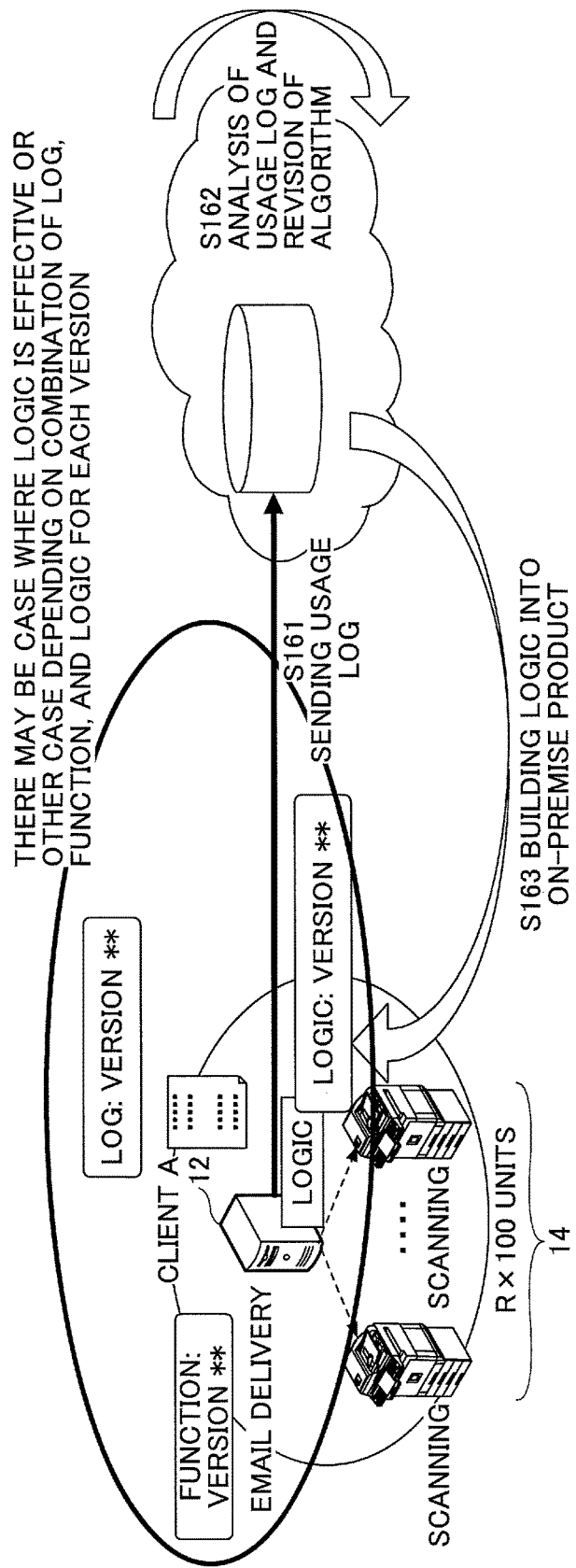
FIG. 26 is a diagram illustrating a summary of an exemplary process of the information processing system of a third embodiment of the present invention.

FIG. 26 is a diagram illustrating a summary of an exemplary process of the information processing system of the third embodiment of the present invention. As illustrated in FIG. 26, 100 units of the apparatuses 14 are included in the client environment of the client A. As illustrated in FIG. 26, the version is given to each of the function, and the log (the schema), and the logic. In steps S161 to S163, the cloud service system 10 receives the user log from the client environment of the client A and feeds back the logic in consideration with a combination of the versions of the function, and the log (the schema), and the logic.

FIG. 27 illustrates a check of the combination of the function of the client environment, the log (the schema), and the logic at a time of version-up of the function of the client environment, the log (the schema), and the logic. As illustrated in FIG. 27, any one of a process A to a process C is performed using the combination at the time of the version-up of the function of the client environment, the log (the schema), and the logic.

For example, the process A illustrated in FIG. 27 corresponds to "there may be a case where the logic is not useful in the version of the logic in a case where an updated logic is applied to an old function or an old log".

The process A is determined at the time of applying the logic while considering the version of the function or the version of the log in the logic. Instead the process A allows the logic memory unit 30 to have the version information of the function or the version information of the log and determines at the time of applying the logic.

The process B checks that a schema change of the log does not influence the logic on the side of the cloud service system 10. The process C checks that a version-up of the function does not influence the logic on the side of the cloud service system 10.

Figure 28A:
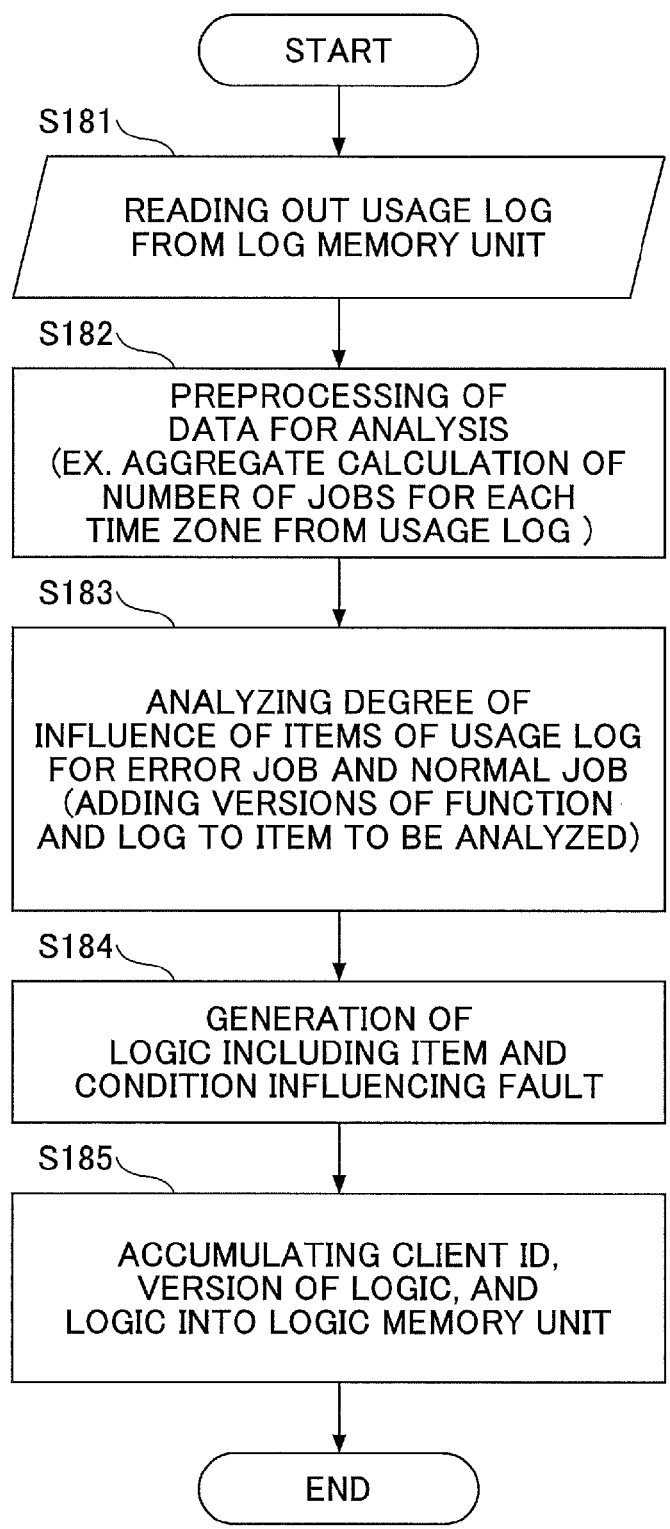

The process A in a case of considering the version of the function or the version of the log in the logic is performed as illustrated in, for example, FIGS. 28A to 28C. FIGS. 28A to 28C are diagrams illustrating an exemplary process in a case where the version of function or the version of the log is considered in the logic.

In step S181, the log analyzing unit 28 of the cloud service system 10 reads out the usage log 1200 illustrated in, for example, FIG. 28B from the log memory unit 32. The usage log 1200 includes an item of the version of the function and an item of the version of the log. In step S182, the log analyzing unit 28 performs preprocessing of the usage logs for the analysis.

In step S183, the log analyzing unit 28 analyzes a degree of influence of the items of the usage logs for the error job whose status information is "error" and the normal job whose status information is "finish". In step S183, the degrees of influence of the item of the version of the function and the item of the version of the log are analyzed.

In step S184, the logic generating unit 26 generates the logic including the items and the conditions, which influence the fault such as the error and the failure, based on the degree of influence of each item obtained by analyzing the usage logs by the log analyzing unit 28. In step S185, the logic generating unit 26 associates the logic generated in step S184 with the client ID and the version of the logic, and causes the associated logic, client ID, and version of the logic to be accumulated in the logic memory unit 30.

The content of the logic is as follows:
function information "Scan to Mail"
job information "Email"
file type "PDF"
file size "3000 kbyte or greater"
80 jobs or greater per minute In the case where the version of the function or the version of the log is considered in the logic, the content of the logic is changed as follows:
The content of the logic:
function information "Scan to Mail"
job information "Email"
file type "PDF"
file size "3000 kbyte or greater"
80 jobs or greater per minute
version of function up to "2.1.1"
version of log up to "1.0.0"

The process A of allowing the logic memory unit 30 to have the version information of the function or the version information of the log and determining at the time of applying the logic uses the version information of the function or the version information of the log, which is stored in the logic memory unit 30 as illustrated in, for example, FIG. 29.

FIG. 29 illustrates a structure of other exemplary accumulated data accumulated in the logic generating unit. As illustrated in FIG. 29, the logic memory unit 30 accumulates accumulated data obtained by adding the version of the function and the version of the log as the items to the structure of the accumulated data illustrated in FIG. 16.

Figure 30:
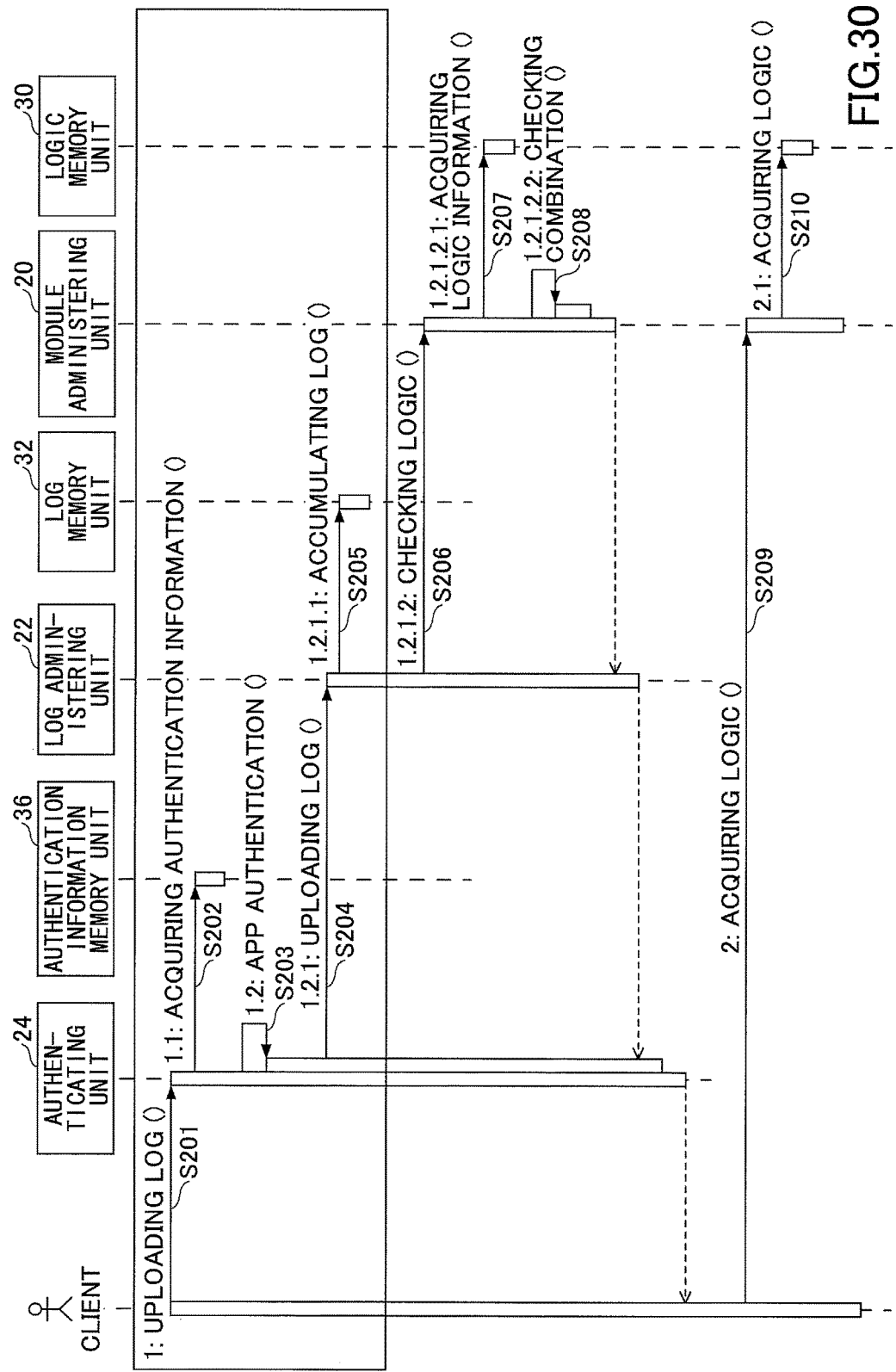
FIG. 30 is a sequence diagram illustrating another exemplary process of checking and updating the logic.

The process A of allowing the logic memory unit 30 to have the version information of the function or the version information of the log and determining at the time of applying the logic is performed according to a procedure as illustrated in, for example, FIG. 30. FIG. 30 is a sequence diagram illustrating another exemplary process of checking and updating the logic.

Because the processes of steps S201 to S206 are similar to the processes of steps S100 to S105 of FIG. 15, explanation is omitted. In step S207, the module administering unit 20 receives the request to check the logic and acquires the version of the logic, the version of the function, and the version of the log from the logic memory unit 30.

In step S208, the module administering unit 20 checks necessity of updating the logic based on the combination of the versions of the logic, the versions of the function, and the versions of the log, which are acquired from the logic memory unit 30. Then, the module administering unit 20 reports necessity whether the logic is updated through the log administering unit 22 and the authenticating unit 24 to the information processing apparatus 12, which is the client. If the necessity of updating the logic exists, the clients proceeds to step S109 and requests the module administering unit 20 of the cloud service system 10 to acquire the logic. The module administering unit 20 acquires the requested logic from the logic memory unit 30, and sends the acquired logic to the client.

As described, the information processing apparatus 12, which is the client, determines the necessity whether the logic is updated using the combination of the versions of the logic, the versions of the function, and the versions of the log at the timing of uploading the usage log to the cloud service system 10 and thereafter acquires the logic.

Meanwhile, the process B and the process C check whether the schema change of the log does not influence the logic or whether the version-up of the function does not influence the logic according to the procedure illustrated in, for example, a procedure illustrated in, for example, FIG. 31. FIG. 31 is a flowchart of an exemplary process of checking that the schema change of the log in the process B and the process C does not influence the logic or that the version-up of the function does not influence the logic. Instead, referring to FIG. 31, the process A allows the logic memory unit 30 to have the version information of the function or the version information of the log and determines by using at the time of applying the logic.

In step S221, the module administering unit 20 determines whether the version of the logic built in the client is up (whether there is a logic of a newer version than the version of the logic built in the client).

If the version of the logic built in the client is up, the module administering unit 20 determines whether the version of the function is a target of the logic in step S222. If the version of the function is the target of the logic, the module administering unit 20 determines whether the version of the log is the target of the logic.

If the version of the log is the target of the logic, the module administering unit 20 reports that there is the necessity of updating the logic through the log administering unit 22 and the authenticating unit 24 to the information processing apparatus 12, which is the client. If the version of the function is not the target of the logic in step S222 or if the version of the log is not the target of the logic in step S223, the process goes to step S228. Then, the module administering unit 20 reports that there is no necessity of updating the logic through the log administering unit 22 and the authenticating unit 24 to the information processing apparatus 12, which is the client.

In step S221, if the version of the logic built in the client is up, the module administering unit 20 determines whether the version of the function is the target of the logic in step S224. If the version of the function is the target of the logic, the module administering unit 20 determines whether the version of the log is the target of the logic in step S225.

If the version of the log is the target of the logic, the process goes to step S228, and the module administering unit 20 reports that there is not the necessity of updating the logic through the log administering unit 22 and the authenticating unit 24 to the information processing apparatus 12, which is the client.

If the version of the function is not the target of the logic in step S224 or if the version of the log is not the target of the logic in step S225, the process goes to step S226. In step S226, the logic generating unit 26 performs a regeneration process of the logic using the corresponding version of the function and the corresponding version of the log.

The process goes to step S227. In step 227, the module administering unit 20 determines whether an original logic is still applicable based on the regenerated logic. If the original logic is still applicable, the process goes to step S228, and the module administering unit 20 reports that there is not the necessity of updating the logic through the log administering unit 22 and the authenticating unit 24 to the information processing apparatus 12, which is the client.

If the original logic is not applicable, the process goes to step S229, and the module administering unit 20 reports that there is the necessity of updating the logic through the log administering unit 22 and the authenticating unit 24 to the information processing apparatus 12, which is the client.

<General Overview>

Within the third embodiment, a version is given to each of the function, the log (the schema), and the logic, and the combination of the versions is used to enable the optimum logic to be built in the on-premise product.

The present invention is not limited to the specifically disclosed embodiments, and variations and modifications may be made without departing from the scope of the present invention. The cloud service system 10 is an example of an information processing system storing history information, which is of an apparatus and is acquired from the client environment side, in claims. The log analyzing unit 28 is an example of an analyzing unit in the claims. The logic generating unit 26 is an example of a generating unit in the claims. The module administering unit 20 is an example of an administering unit in the claims. The logic memory unit 30 is an example of a memory unit in the claims.

An exemplary logic is included in an algorithm of, for example, a process of outputting an alert when a corresponding condition is satisfied, is implemented by a program or a data format, and includes at least one item and a condition corresponding to the at least one item as illustrated in, for example, FIG. 8A.

An exemplary purpose of the logic is to predict the fault such as the error and the failure.

An exemplary method of generating the logic is, in steps S84, S145, and S184, the logic generating unit 26 generates the logic including the at least one item and the corresponding condition, which influence the failure such as the error and the failure, based on the degree of influence of each item obtained by analyzing the usage logs by the log analyzing unit 28.

An exemplary hardware being built in as the logic is the log-analyzing logic unit 72 implemented by processing the program or the data format in a hardware processor.

According to the embodiment of the present invention, there is provided the information processing system in which the fault prediction logic based on the history information, which is acquired from the apparatus on the client environment side, can be built into the client environment side.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system comprising:
   a first information processing system including at least one first apparatus;
   a second information processing system including at least one second apparatus; and
   a third information processing system storing history information of the at least one first apparatus included in the first information processing system, the third information processing system including a hardware processor implementing:
   analyzing the history information to acquire a degree of influence for an item included in the history information corresponding to a fault occurring in the at least one first apparatus; and
   generating a fault prediction logic of predicting a fault occurring in the at least one first apparatus using the item having a relatively high degree of influence and a value of a case where the fault occurs in the at least one first apparatus based on a result of the analysis; and
   building the generated fault prediction logic into the at least one first apparatus included in the first information processing system and the at least one second apparatus included in the second information processing system,
   the first information processing system including a first hardware processor implementing:
   monitoring the history information of the at least one first apparatus;
   detecting a state of matching a content of the built-in fault prediction logic; and
   performing a predetermined action in a case where the state of matching the content of the built-in fault prediction logic is detected, and
   the second information processing system including a second hardware processor implementing:
   monitoring the history information of the at least one second apparatus;
   detecting a state of matching the content of the built-in fault prediction logic; and
   performing a predetermined action in the case where the state of matching the content of the built-in fault prediction logic is detected.

2. The information processing system according to claim 1,
   wherein the generating of the fault prediction logic generates the fault prediction logic using the value of the case where the fault occurs in the at least one first apparatus corresponding to the item having the relatively high degree of influence for the fault occurring in the at least one first apparatus, the fault prediction logic causes a client environment side, which includes the first information and the second processing system, to perform the predetermined action in the case where the state of matching the content of the built-in fault prediction logic is detected.

3. The information processing system according to claim 2,
   wherein the generating of the fault prediction logic causes the client environment side to generate the fault prediction logic that performs a reporting process of reporting to a user as the predetermined action in the case where the state of matching the content of the built-in fault prediction logic is detected.

4. The information processing system according to claim 2,
   wherein the generating of the fault prediction logic causes the client environment side to generate the fault prediction logic that performs a function limitation of the at least one first apparatus and the at least one second apparatus as the predetermined action in the case where the state of matching the content of the built-in fault prediction logic is detected.

5. The information processing system according to claim 1,
wherein the analyzing of the history information reanalyzes to acquire the degree of influence for the item included in the history information corresponding to the fault occurring in the at least one first apparatus in response to a change in the item included in the history information, and
wherein the generating of the fault prediction logic regenerates the fault prediction logic of predicting the fault occurring in the at least one first apparatus using the item having the relatively high degree of influence and the value of the case where the fault occurs in the at least one first apparatus based on a result of the reanalysis.

6. The information processing system according to claim 1,
wherein the third information processing system further includes a memory unit storing the generated fault prediction logic and version information while associating the generated fault prediction logic with the version information, and
wherein the hardware processor included in the third information processing system further implementing:
reporting an existence of the fault prediction logic associated with new version information, which is newer than the version information of the fault prediction logic built in a client environment side, which includes the first information and the second processing system, if the fault prediction logic associated with the new version information is stored in the memory unit when the history information is received from the client environment side.

7. The information processing system according to claim 1,
wherein the third information processing system further includes a memory unit storing the generated fault prediction logic, version information of functions of the at least one first apparatus and the at least one second apparatus, version information of a log, and version information of the fault prediction logic while associating the generated fault prediction logic with the version information of the functions of the at least one first apparatus and the at least one second apparatus, the version information of the log, and the version information of the fault prediction logic, and
wherein the hardware processor included in the third information processing system further implementing:
reporting an existence of the fault prediction logic associated with the version information to be updated to a client environment side which includes the first information and the second processing system, based on a combination of the version information of the fault prediction logic built in the client environment side, the version information of the functions of the at least one first apparatus and the at least one second apparatus, and the version information of the log when the history information is received from the client environment side.

8. The information processing system according to claim 1,
wherein the generating of the fault prediction logic generates the fault prediction logic to be built in a client environment side, which includes the first information and the second processing system, using
the item having a relatively high degree of influence, the value of the case where the fault occurs in the at least one first apparatus,
version information of a function of the at least one first apparatus, and
version information of a log, based on a result of the analysis.

9. An information processing system comprising:
at least one first information processing system including at least one first apparatus;
at least one second information processing system including at least one second apparatus; and
a third information processing system storing history information of the at least one first apparatus and the at least one second apparatus, the third information processing system including a hardware processor implementing:
analyzing the history information to acquire a degree of influence for an item included in the history information corresponding to a fault occurring in the at least one first apparatus and the at least one second apparatus; and
generating a fault prediction logic of predicting a fault occurring in the at least one first apparatus and the at least one second apparatus using the item having a relatively high degree of influence and a value of a case where the fault occurs in the at least one first apparatus and the at least one second apparatus based on a result of the analysis; and
building the generated fault prediction logic into the at least one first apparatus included in the at least one first information processing system and the at least one second apparatus included in the second information processing system,
the at least one first information processing system including a first hardware processor implementing:
monitoring the history information of the at least one first apparatus;
detecting a state of matching a content of the built-in fault prediction logic; and
performing a predetermined action in a case where the state of matching the content of the built-in fault prediction logic is detected, and
the at least one second information processing system including a second hardware processor implementing:
monitoring the history information of the at least one second apparatus;
detecting a state of matching the content of the built-in fault prediction logic; and
performing a predetermined action in the case where the state of matching the content of the built-in fault prediction logic is detected.

10. A method for providing a built-in fault prediction logic performed in an information processing system that includes
a first information processing system including at least one first apparatus,
a second information processing system including at least one second apparatus, and
a third information processing system storing history information of the at least one first apparatus included in the first information processing system, the third information processing system, the method comprising:
analyzing, by the third information processing system, the history information to acquire a degree of influence for an item included in the history information corresponding to a fault occurring in the at least one first apparatus;

generating, by the third information processing system, a fault prediction logic of predicting a fault occurring in the at least one first apparatus using the item having a relatively high degree of influence and a value of a case where the fault occurs in the at least one first apparatus based on a result of the analysis;

building, by the third information processing system, the generated fault prediction logic into the at least one first apparatus included in the first information processing system and the at least one second apparatus included in the second information processing system;

monitoring, by the first information processing system, the history information of the at least one first apparatus;

detecting, by the first information processing system, a state of matching a content of the built-in fault prediction logic;

performing, by the first information processing system, a predetermined action in a case where the state of matching the content of the built-in fault prediction logic is detected;

monitoring, by the second information processing system, the history information of the at least one second apparatus;

detecting, by the second information processing system, a state of matching the content of the built-in fault prediction logic; and performing, by the second information processing system, a predetermined action in the case where the state of matching the content of the built-in fault prediction logic is detected.

11. The method for providing the built-in fault prediction logic according to claim 10, wherein the generating of the fault prediction logic generates the fault prediction logic using the value of the case where the fault occurs in the at least one first apparatus corresponding to the item having the relatively high degree of influence for the fault occurring in the at least one first apparatus, the fault prediction logic causes a client environment side, which includes the first information and the second processing system, to perform the predetermined action in the case where the state of matching the content of the built-in fault prediction logic is detected.

12. The method for providing the built-in fault prediction logic according to claim 11, wherein the generating of the fault prediction logic causes the client environment side to generate the fault prediction logic that performs a reporting process of reporting to a user as the predetermined action in the case where the state of matching the content of the built-in fault prediction logic is detected.

13. The method for providing the built-in fault prediction logic according to claim 11, wherein the generating of the fault prediction logic causes the client environment side to generate the fault prediction logic that performs a function limitation of the at least one first apparatus and the at least one second apparatus as the predetermined action in the case where the state of matching the content of the built-in fault prediction logic is detected.

14. The method for providing the built-in fault prediction logic according to claim 10, wherein the analyzing of the history information reanalyzes to acquire the degree of influence for the item included in the history information corresponding to the fault occurring in the at least one first apparatus in response to a change in the item included in the history information, and wherein the generating of the fault prediction logic regenerates the fault prediction logic of predicting the fault occurring in the at least one first apparatus using the item having the relatively high degree of influence and the value of the case where the fault occurs in the at least one first apparatus based on a result of the reanalysis.

15. The method for providing the built-in fault prediction logic according to claim 10, wherein the third information processing system further includes a memory unit storing the generated fault prediction logic and version information while associating the generated fault prediction logic with the version information, and wherein the hardware processor included in the third information processing system further implementing:

reporting an existence of the fault prediction logic associated with new version information, which is newer than the version information of the fault prediction logic built in a client environment side, which includes the first information and the second processing system, if the fault prediction logic associated with the new version information is stored in the memory unit when the history information is received from the client environment side.

16. The method for providing the built-in fault prediction logic according to claim 10, wherein the third information processing system further includes a memory unit storing the generated fault prediction logic, version information of functions of the at least one first apparatus and the at least one second apparatus, version information of a log, and version information of the fault prediction logic while associating the generated fault prediction logic with the version information of the functions of the at least one first apparatus and the at least one second apparatus, the version information of the log, and the version information of the fault prediction logic, and wherein the hardware processor included in the third information processing system further implementing:

reporting an existence of the fault prediction logic associated with the version information to be updated to a client environment side, which includes the first information and the second processing system, based on a combination of the version information of the fault prediction logic built in the client environment side, the version information of the functions of the at least one first apparatus and the at least one second apparatus, and the version information of the log when the history information is received from the client environment side.

17. The method for providing the built-in fault prediction logic according to claim 10, wherein the generating of the fault prediction logic generates the fault prediction logic to be built in a client environment side, which includes the first information and the second processing system, using the item having a relatively high degree of influence, the value of the case where the fault occurs in the at least one first apparatus, version information of a function of the at least one first apparatus, and version information of a log, based on a result of the analysis.

* * * * *